(12) United States Patent
Powers et al.

(10) Patent No.: US 7,293,235 B1
(45) Date of Patent: Nov. 6, 2007

(54) PREDICTING AVATAR MOVEMENT IN A DISTRIBUTED VIRTUAL ENVIRONMENT

(75) Inventors: Simon Julian Powers, Suffolk (GB); Jason Morphett, Suffolk (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/743,898

(22) PCT Filed: Aug. 12, 1999

(86) PCT No.: PCT/GB99/02663

§ 371 (c)(1),
(2), (4) Date: Jan. 17, 2001

(87) PCT Pub. No.: WO00/10130

PCT Pub. Date: Feb. 24, 2000

(30) Foreign Application Priority Data

Aug. 14, 1998 (GB) .................... 9817834.6

(51) Int. Cl.
*G06F 3/048* (2006.01)
*G63F 9/24* (2006.01)
*G63F 9/02* (2006.01)

(52) U.S. Cl. .............. 715/706; 463/1; 463/6; 463/9; 463/49; 703/6; 703/11; 703/20

(58) Field of Classification Search ........ 345/700–866, 345/473–475; 463/1–69; 709/200–253; 715/757–759, 848, 849, 850–852, 706, 733; 719/311

See application file for complete search history.

(56) References Cited

U.S. PATENT DOCUMENTS

| | | | | |
|---|---|---|---|---|
| 5,353,042 A * | 10/1994 | Klapman et al. | ........... | 345/156 |
| 5,736,982 A * | 4/1998 | Suzuki et al. | ............... | 715/706 |
| 5,793,382 A * | 8/1998 | Yerazunis et al. | ......... | 345/474 |
| 6,219,045 B1 * | 4/2001 | Leahy et al. | ................ | 345/757 |
| 6,226,669 B1 * | 5/2001 | Huang et al. | ............... | 709/204 |
| 6,307,567 B1 * | 10/2001 | Cohen-Or | ................... | 345/619 |
| 6,366,285 B1 * | 4/2002 | Brush et al. | ................ | 345/473 |
| 6,448,978 B1 * | 9/2002 | Salvador et al. | ........... | 715/741 |
| 6,570,563 B1 * | 5/2003 | Honda | ........................ | 345/419 |

FOREIGN PATENT DOCUMENTS

EP 0696018 A2 * 2/1996

* cited by examiner

*Primary Examiner*—William Thomson
*Assistant Examiner*—Charles E Anya
(74) *Attorney, Agent, or Firm*—Nixon & Vanderhye P.C.

(57) ABSTRACT

A method and apparatus for predicting the likelihood of an avatar under the control of a user in a virtual environment moving with a predetermined range of a boundary as disclosed in which the movement of the avatar in the virtual environment is monitored for a period of time, a model of avatar movement is determined using the monitor movement, and the likelihood of the avatar movement within the predetermined of a boundary is predicted using the model.

34 Claims, 19 Drawing Sheets

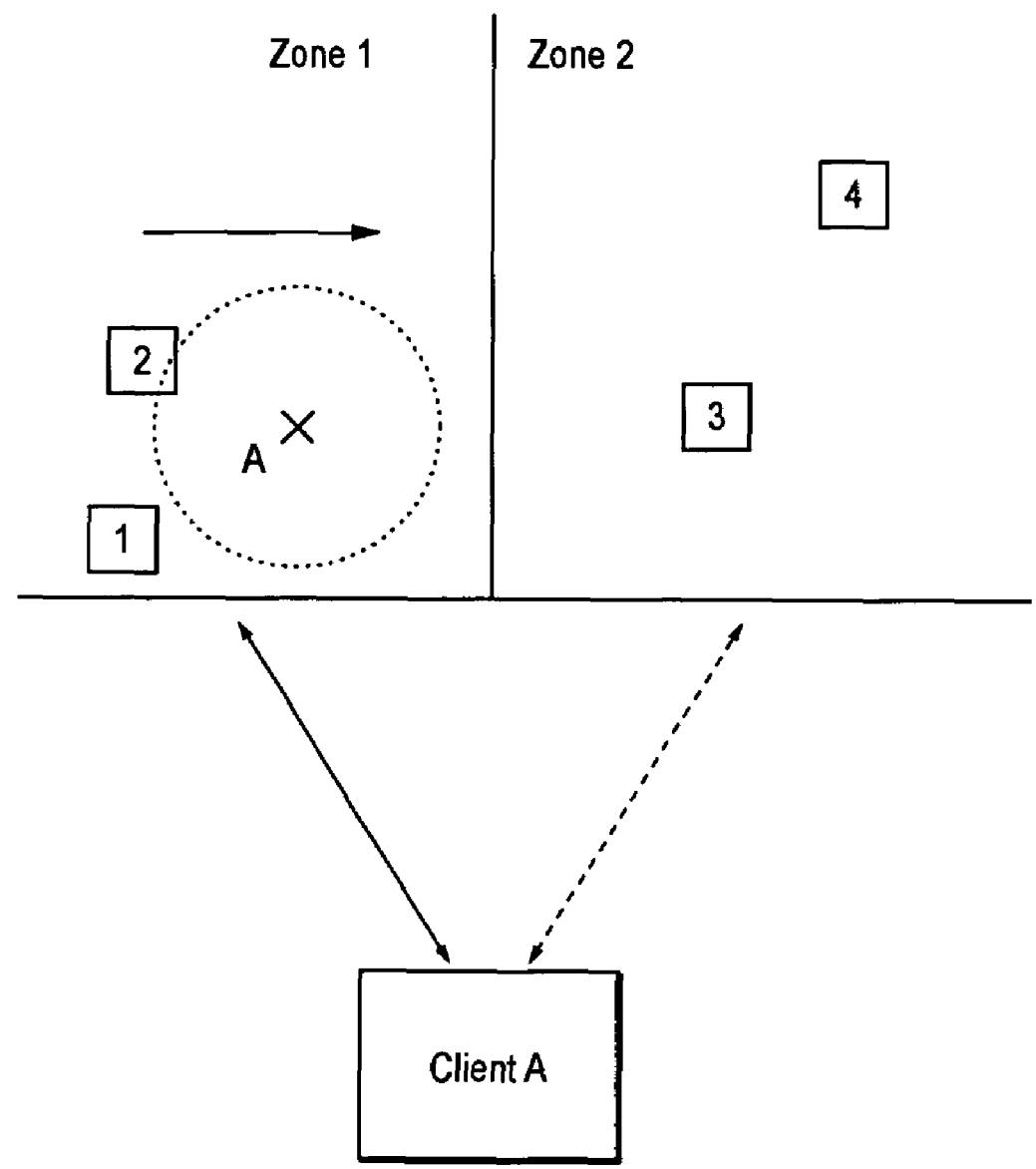
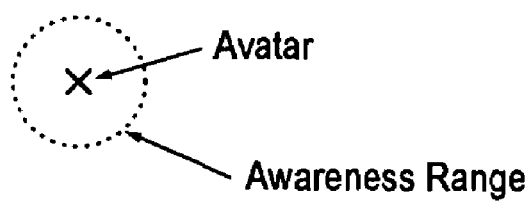
Fig. 3

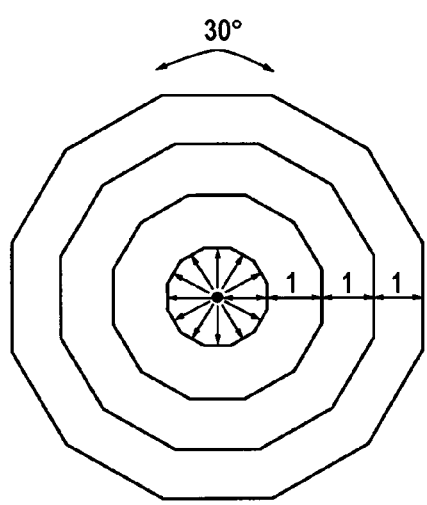
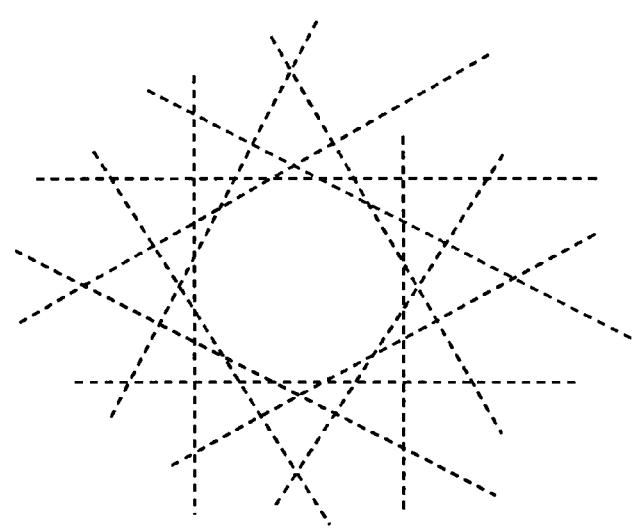
Fig. 15a                    Fig. 15b

........... Boundary Segment not crossed

——— Boundary Segment crossed

PREDICTING AVATAR MOVEMENT IN A DISTRIBUTED VIRTUAL ENVIRONMENT

RELATED APPLICATION

This application is related to copending commonly assigned application Ser. No. 09/194,317 filed Nov. 24, 1998.

BACKGROUND

1. Technical Field

The present invention generally relates to a distributed virtual environment in which the movement of an avatar controlled by a user is predicted. In particular, the present invention relates to a distributed virtual environment which is divided into zones wherein the likelihood of an avatar moving within a predetermined range of a zone boundary is predicted.

2. Description of Related Art

A virtual environment is a computer model of a three-dimensional space. At their most basic virtual environment applications allow a user to specify a "camera" location from which they wish to view the space. The application then renders the appropriate view of the environment from this location and presents it to the user on a monitor of the computer running the application. With this degree of functionality virtual environments can be used in a wide variety of visualisation applications e.g. taking a walk around a building not yet constructed.

Most virtual environment applications are however considerably more sophisticated than this and offer both an environment populated with objects (termed entities) which possess both a state and behaviour, and a means for the user to interact with these entities.

Virtual environments have many applications. One which has become particularly popular is in the field of computer games. Games such as Doom and Quake allow a user to control an entity to interact with the virtual environment modifying the state of entities within the virtual environment.

A further development of the virtual environment concept is the shared virtual environment. This involves a number of users, each with their own copy of the relevant virtual environment application (termed a client) experiencing a three dimensional space which is common to them all. Each user not only perceives the results of their interactions with the entities but also the results of other users interactions. To represent the location of a user in a shared virtual environment a special case of entity, known as an avatar is employed. This provides a visual representation on all of the clients as to where a particular user is viewing the scene from.

A shared virtual environment is usually implemented using a computer network wherein remote users operate clients in the network which incorporates servers for the virtual environment.

For simple virtual environments, where the number of entities is limited, implementing a shared version is comparatively straightforward. As each user joins the virtual environment a client is provided with the current state of all entities within it. As the environment state changes, due to either user invoked behaviour or autonomous behaviour, the newly generated state information is distributed to all clients, allowing a common view between different clients to be maintained.

However, for larger virtual environments, where both the number of simultaneous users and entities is large, this approach breaks down. This is because the amount of information required to supply and support a total-description of state at each client overwhelms either the network connection of the client or the processing power available to the client.

One common solution to this problem is to utilise the fact that a client does not need to maintain a valid state description of any entities its user is unaware of. For example, if two avatars are playing tennis, it is important that both their clients are kept fully informed of the position of the ball. However, for the users who can't see or hear the tennis court it is not necessary to inform them of either the ball state or the state of the avatars playing tennis. Only when they move into a position where the court can be observed is this information required.

A common implementation of this solution sub-divides the environment into a number of regions, termed zones and then groups the entities on the basis of the zone they occupy. Each users avatar location is then used to assess what zones the user is aware of, and the client is informed of the state of all entities within these zones. As entities update their state they broadcast the change only to the clients aware of their current zone. In this way the network and processing load on each client is proportional to the state changes in their avatars surrounding location, rather than the total environment.

An example of an implementation of this type of this approach is NPSNET (Macedonia et al. "NPSNET: A Network Software Architecture for Large Scale Virtual Environments", Presence, Volume 3, No. 4, Fall 1994) the content of which is hereby incorporated by reference. In this implementation the virtual environment is divided into a number of hexagonal zones and a multicast address is associated with each zone. Each client maintains a network connection to the multicast address of the zone its avatar is in. This address is used by the client to broadcast any avatar state change e.g. movement. Additionally the client also maintains network connections to the multicast address of any zones the user is aware of i.e. within visual or aural range. Hence two clients with neighbouring avatars will share avatar state updates by virtue of using common multicast addresses. However, two users widely separated within the virtual environment will not share awareness of any zones and hence will not load each others network connection with shared state information.

FIG. 1 is an illustration of this zonal distributed virtual environment. As can be seen in FIG. 1 an avatar has a range of awareness which comprises a volume which is often spherical and is centred on an avatar. This range of awareness encloses all the entities that a client needs to possess the state of in order to accurately display the world to the user. The volume is often defined with respect to the visual range of any rendering performed at the client although it may be derived from the range of any of the relevant senses e.g. hearing.

In FIG. 1 the illustrated area of the virtual environment is divided into nine geographic areas or zones each of which has a multicast address associated with it. Client A has an avatar A in zone 3 and has a range of awareness which spans into zones 2 and 6. Thus, client A monitors zones 2, 3 and 6. Since the avatar A can modify the state of entities in zone 3, and since the avatar state changes, updates are made using the multicast address for zone 3. Avatar B has a visual range which encompasses zone 3 and client B therefore listens to zone 3's multicast address as well as zone 2's multicast address in which the avatar B is present. Therefore, any changes to avatar A will be detected by client B and similarly any changes to avatar B will be detected by client A. In contrast, avatar C has no visual awareness of zones 2 or 3 and therefore client C does not listen to their multicast addresses. This reduces the network load.

FIG. 2 is a schematic diagram of a network hosting the virtual environment schematically illustrated in FIG. 1. Nine servers (1-9) are illustrated interconnected by a communications network 10 such as a local area network (LAN) or a wide area network (WAN). Each server is responsible for a respective geographical zone in the virtual environment and receives and transmits the status of the zone using a unique multicast address assigned for the zone. Also connected to the communications network 10 are three clients, client A (11), client B (12) and client C (13). Each client hosts an avatar and thus maintains the virtual environment experienced by the avatar. As described above each client will connect to a multicast address i.e. to a server dependent upon the zones of which an avatar is aware. A client can either comprise a workstation or an application i.e. a computer program running on a computer. Thus a single computer may host more than one client. Similarly a server can either comprise a dedicated computer or an application i.e. a computer program running on a computer. Thus a single computer may host more than one server.

In an alternative arrangement disclosed in our copending Application No. GB 9722343.2 filed on 22 Oct. 1997, the content of which is hereby incorporated by reference, zone managers are responsible for managing each zone within the virtual environment and thus the location of the avatar within the virtual environment and the awareness range of the avatar will determine the communications required between the client and the zone managers.

In this arrangement objects in the virtual environment have a conceptual model, a dynamics model and a visual model. A rule manager is associated with the conceptual model. The visual model is provided at each client and the dynamic model is associated with the zone managers. Thus only dynamics information needs to be passed between the zone managers and the clients.

A problem identified by the inventors in a zoned distributed environment is how to link avatar movement to zone awareness. FIG. 3 illustrates this problem. Avatar A is in zone 1 and moving towards the boundary between zone 1 and zone 2. Client A is therefore aware of the state of the entities within zone 1 (entities 1 and 2) but is unaware of the state of any of the entities within zone 2 (entities 3 and 4). At some point in the future, avatars A awareness will overlap into zone 2 and client A must become fully informed of the state of all entities in zone 2 (entities 3 and 4).

If client A only starts to fetch the initial state of the entities in zone 2 at the point avatar A becomes initially aware of zone 2 i.e. the awareness region touches the boundary between zones 1 and 2, a number of problems can arise:

1. Graphical inconsistency. While the initial state of the zone is being fetched the avatar may continue moving towards it. Hence the avatar may be in the visual range of entities which have not yet been supplied. When the initial state download is complete these entities will suddenly appear, giving a visual glitch.

2. User control problems. If the avatar is prevented from moving whilst fetching the state of a zone (in an effort to prevent the graphical inconsistency described above), it will reduce the interactive nature of the client user interface.

3. State Inconsistency. If the avatar is moving fast enough it may even cross into the next zone before its client has a full description of all the relevant entities. This could lead to the client trying to make invalid state settings. For example, placing the avatar in the middle of a wall because at the time the avatar moved the client was unaware of the wall entity.

BRIEF SUMMARY OF EXEMPLARY NON-LIMITING EMBODIMENTS

In order to overcome this problem, one aspect of the present invention provides a method and apparatus for predicting the likelihood of an avatar under the control of a user in a virtual environment moving within a predetermined range of a boundary, wherein the movement of the avatar in the virtual environment is monitored for a period of time, the model of the avatar movement is determined using the monitored movement, and the likelihood of the avatar moving within the predetermined range of a boundary is predicted using the model.

Thus, by monitoring movement of the avatar in the virtual environment for a period of time the pattern of movement can be determined which enables a model to be built. This can then be used to predict avatar movement. The accuracy of the model is important in order to avoid unnecessary downloading of state information. If the current velocity in a direction is simply extrapolated from the current position for a time, a simple prediction can be made. However, such a simple prediction fails to take into account a number of factors that directly affect the probability of an avatar coming within the range of a boundary. A highly experienced user, who knows the environment well, will be able to plan paths in advance and move quickly between known land marks. This will result in long, predictable avatar trajectories. By contrast an inexperienced user will need to stop frequently to reaffirm their position, and will not be able to use known land marks to plan an avatar path. This will reduce the predictability of their avatar. Also, environments such as games and military stimulations where avatar paths are a key part of the user interaction, will result in more predictable avatar trajectories than those where navigation does not play a key role. For example, a large open room used as a chat space will result in fairly static avatars (whilst chatting in groups), with occasional short paths to random parts of the room (when a user spots somebody they want to talk to). By contrast, a game (e.g. Doom or Quake) where the typical goals are "travel to this door", "traverse this door", "find this key", etc will have far more mobile avatars, moving to specific points, and hence producing more predictable paths. Further, the mechanism for controlling an avatar normally has to map the output of the numerous different devices (keyboard, mouse, joystick, tracker ball, etc) into the six degrees of freedom available to an avatar (rotation and translation in three dimensional space). The device and map being used will impact on the trajectory taken by the avatar. For example, using a mouse output mapped directly to an avatar's horizontal motion will result in bursts of short jerky motions. By contrast a keyboard input by its digital nature will tend to produce paths of more consistent motion.

By utilizing a model of avatar movement, these factors can be taken into account to provide a more accurate prediction of the likely behaviour of an avatar based on its past behaviour.

In a virtual environment in accordance with one aspect of the present invention each client utilises an avatar motion predictor which monitors avatar motion in a recent period of time to establish a pattern of avatar behaviour in order to predict the likelihood of an avatar becoming aware of a neighbouring zone.

In order to determine the model of avatar behaviour, movement samples e.g. position, orientation, or velocity can be obtained for a set number of previous avatar movement samples. As new avatar movement information is supplied the model is continuously updated discarding the effect of older movement samples, thus ensuring that the model is of the avatar's current style of movement.

The prediction technique can take into consideration features within the virtual environment which restrict movement of the avatar e.g. a window through which the avatar cannot move but through which the avatar can see into a neighbouring zone. In such a case although the avatar can see into the neighbouring zone, it cannot move into the zone in that direction and must instead take a different path. Thus environmental features will effect the predicted likelihood for example by reducing the predicted likelihood when a wall lies between the avatar and the boundary.

Prediction can also be performed taking into consideration features within the virtual environment which restrict the ability of the avatar to experience the virtual environment e.g. fog or a darkened room. Thus although the avatars awareness zone extends over a boundary into a neighbouring zone, because of the conditions, the awareness range of the avatar is reduced and thus there is no need to fetch the information on the neighbouring zone since it cannot be experienced by the avatar.

The model can be determined as values for run lengths indicating the likelihood of an avatar moving in a direction for a particular length. Alternatively, the model can be determined as run lengths within a corridor indicating the likelihood of the avatar moving within a corridor in a direction for a particular corridor length. A corridor comprises a region in the virtual space coaxial with an initial direction of movement in a new direction outside a previous corridor. The width of the corridor defining the deviation allowed from the initial direction of movement before the movement is used to start a new run length.

In another embodiment the model comprises values for areas around the avatar indicating the likelihood of the avatar moving into the areas. In a further embodiment the model comprises values for directions and distances of movement of the avatar for periods of time.

Using the probability of an avatar moving within an awareness range of a neighbouring zone, together with known network and processing penalties of establishing zone awareness, the client can determine the time at which awareness of the zone should be attained i.e. when information on the state of entities within the zone should be retrieved over the network. If the penalty for fetching the state of the entities in a particular zone is very high on the client network link, the client may decide to wait until the avatar prediction model forecasts a 90% chance of awareness of that zone in the next second, alternatively, if the penalty is low it might decide to play safe and fetch the state of the zone when the model only predicts a 20% chance in the next two seconds.

Thus in accordance with one embodiment of the present invention a more efficient distributed virtual environment is provided by using the prediction together with a cost function related to the client network connection and/or client processing capability or load in order to determine when to establish awareness of a neighbouring zone.

Since the present invention can be implemented in software running on a computer or over a network, the present invention can be embodied as a storage medium storing instructions for controlling a computer to carry out the method and a signal carrying computer code for controlling a computer to carry out the method.

BRIEF DESCRIPTION OF DRAWINGS

The present invention will now be described by way of example with reference to the accompanying drawings, in which:

FIG. 3 is a schematic diagram of an avatar approaching a zone boundary;

FIGS. 15a and 15b illustrate the model using angle and distance;

DETAILED DESCRIPTION OF EXEMPLARY NON-LIMITING EMBODIMENTS

Figure 1:
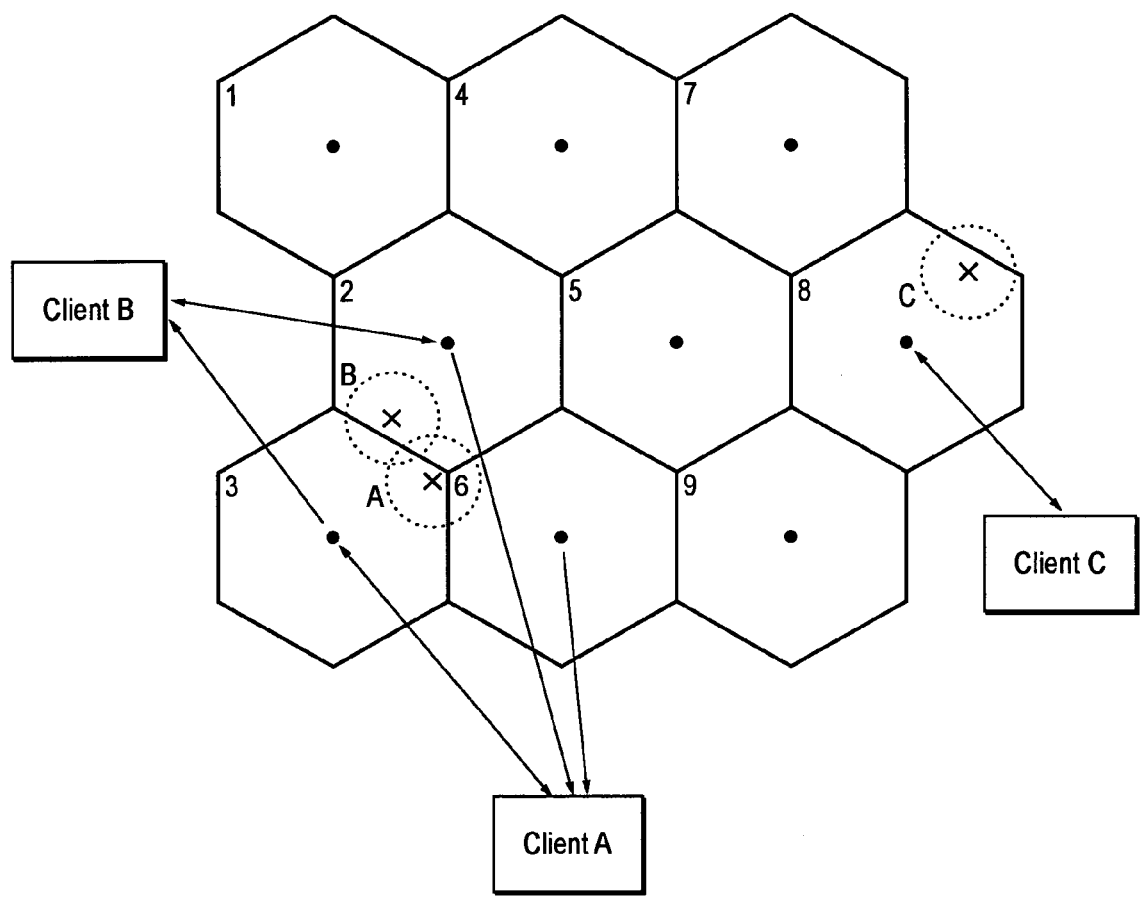
FIG. 1 is a schematic diagram of the NPSNET multicast arrangement.
Figure 2:
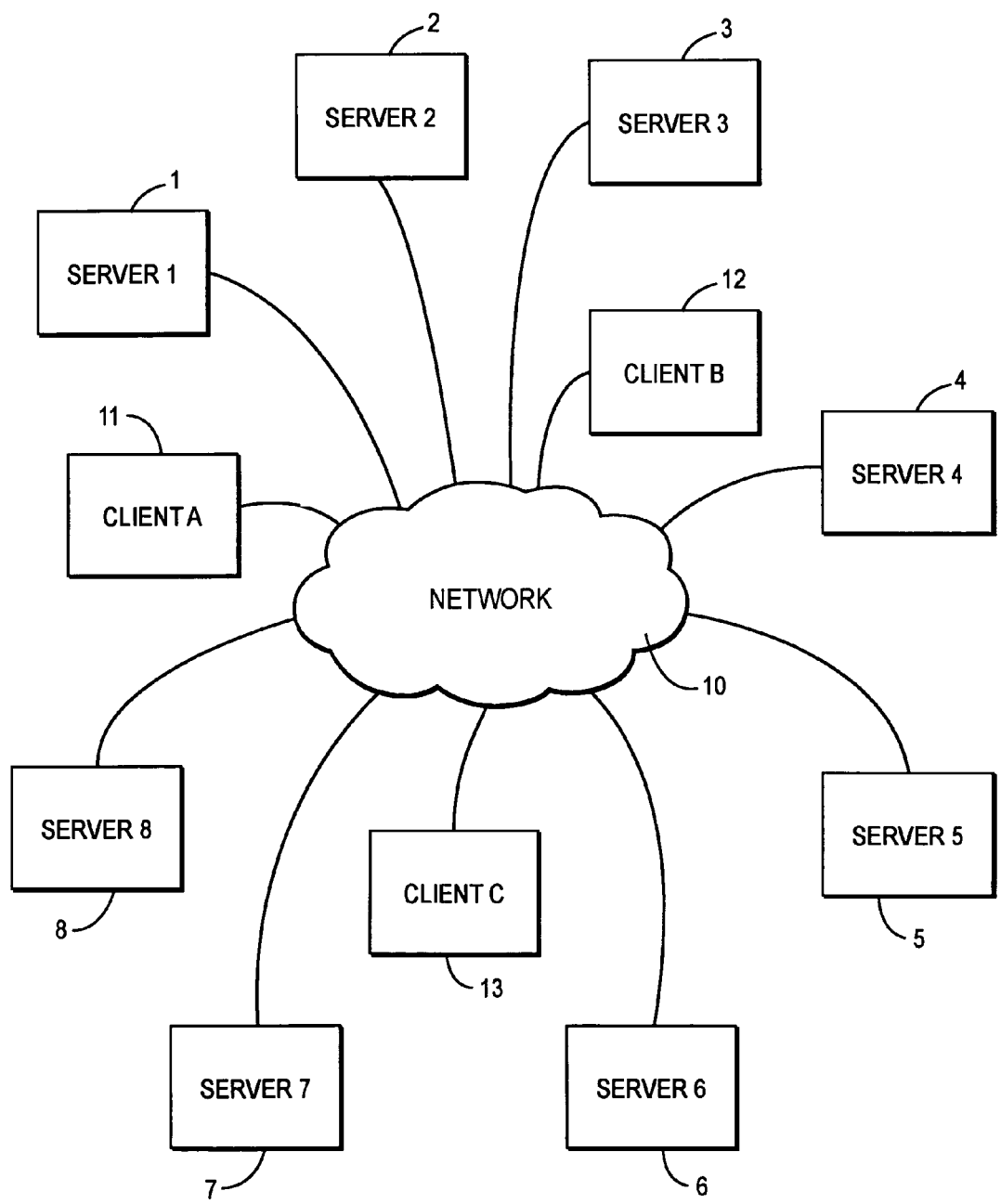
FIG. 2 is a schematic diagram of a network hosting the virtual environment schematically illustrated in FIG. 1.
Figure 4:
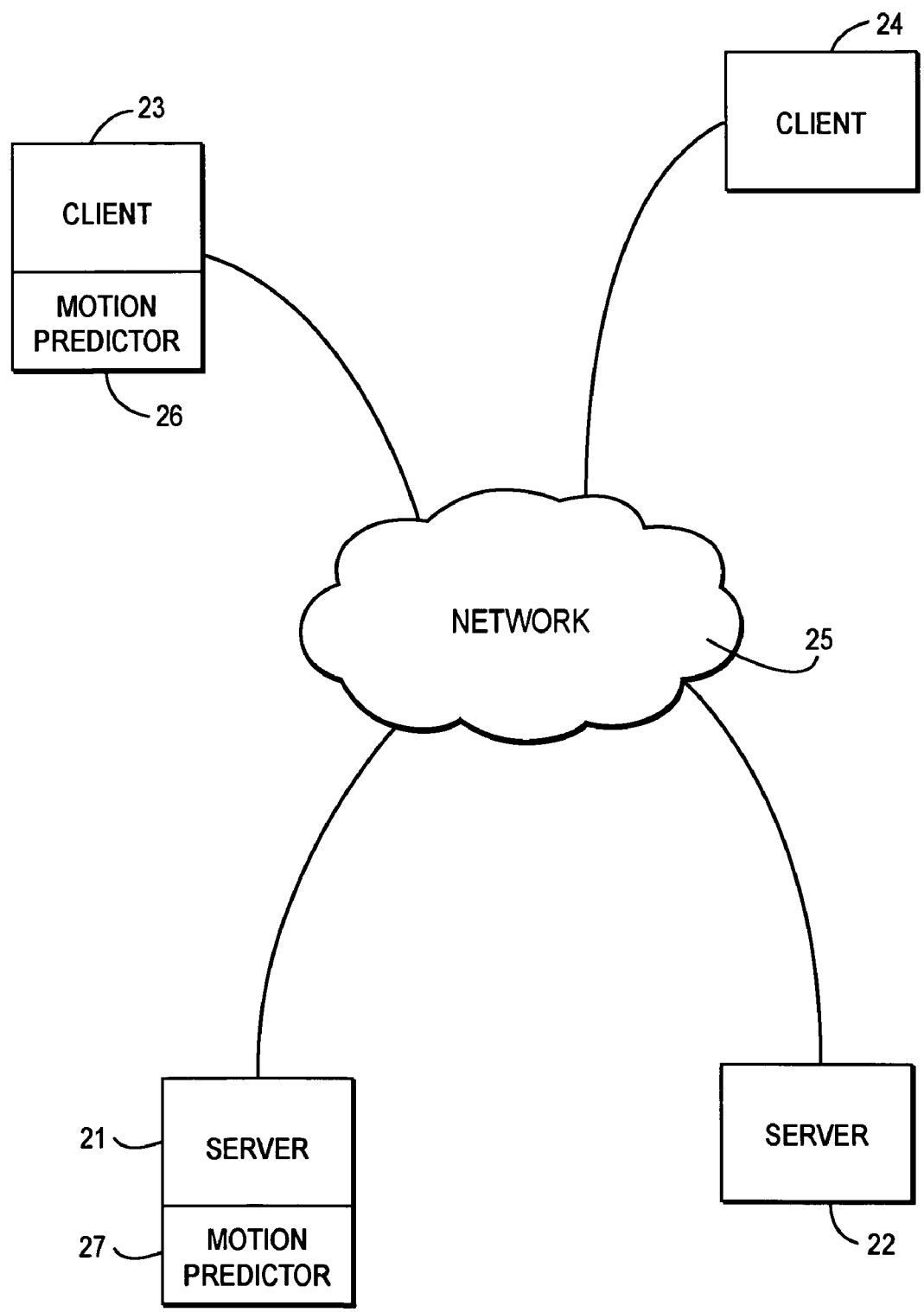
FIG. 4 is a schematic illustration of a network hosting the virtual environment incorporating the prediction technique of an embodiment of the present invention.

FIG. 4 is a schematic illustration of a network in accordance with an embodiment of the present invention. The network comprises servers 21 and 22 interconnected over a communications network 25 to clients 23 and 24. The network is thus similar to FIG. 2 except a motion predictor 26 or 27 can be provided in the client 23 or the server 21 respectively (although the figure illustrates both only one will be provided in practice). The clients 23 and 24 and the servers 21 and 22 can be implemented as a computer program running on a host computer thus allowing multiple clients and servers on a single computer. The motion predictor 26 or 27 can be implemented as a computer program on a computer hosting a client or a server. The location is not important so long as access to information on avatar movement and the virtual environment is available. The communications network 25 can be any form of network such as a LAN or a WAN.

Figure 5:
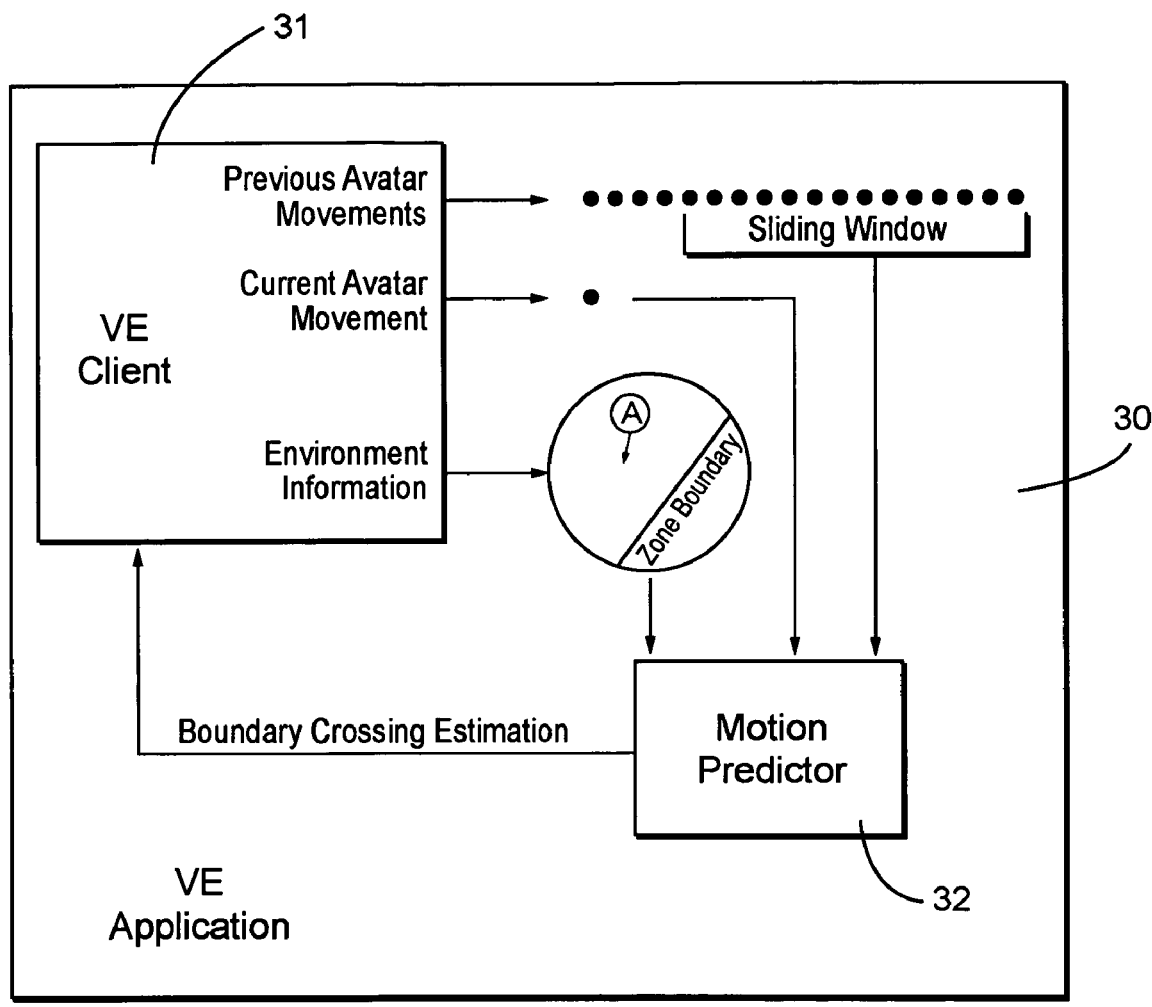
FIG. 5 is a schematic diagram of an embodiment of the present invention.

FIG. 5 illustrates one embodiment of the present invention schematically wherein a virtual environment application 30 is hosted on a virtual environment client 31 controlling avatar movement from which is available the current avatar movement and environment information. Avatar movements for previous time periods are also output and a sliding window of samples (termed the model time frame hereinafter) is used by the motion predictor 32 to build a model of avatar motion. The environment information is used to determine the proximity of the zone boundary to the avatar. Within the virtual environment application 30 the motion predictor 32 predicts the likelihood of an avatar coming within a predetermined range of the boundary of the zone. This prediction is used by a virtual environment client 31 in order to determine when to fetch the state information for a neighbouring zone.

As mentioned above, the motion predictor 31 need not necessarily be placed on the same computer as the virtual environment client 31. If the responsibility for establishing client awareness of a zone is moved to a server e.g. the same server that delivers the zone state information, the motion predictor 31 can be placed on the server.

Since the motion predictor continually builds its model of avatar motion using new avatar movement samples as they are supplied by the client, it will dynamically adapt to new types of motion. For example, if the user redefines the application interface in a way that gives less predictable avatar motion, as new avatar movements samples are fed into the prediction model this new uncertainty will be reflected in the output of the motion predictor. This will again enable the client to modify its policy for establishing its awareness of new zones.

Figure 6:
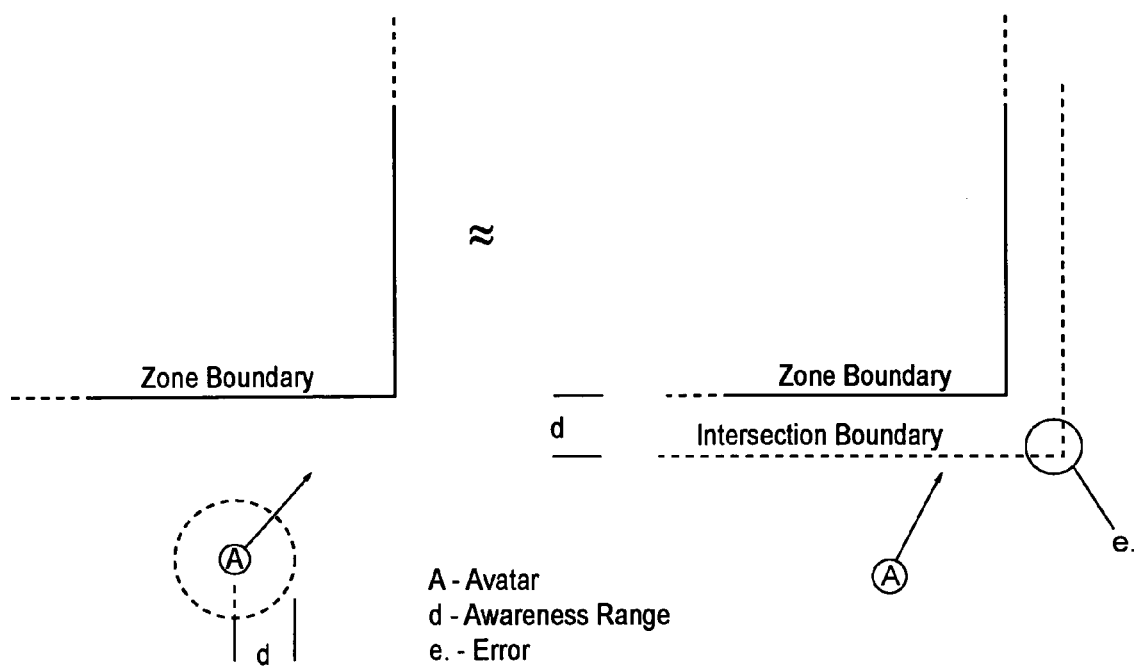
FIG. 6 is a diagram illustrating the termination of the intersection boundary from the zone boundary.

In normal operation the client will want an assessment of the avatars awareness crossing into a zone. This is equivalent to detecting whether an avatar is within an awareness range of the zone boundary. It is thus possible to determine an intersection boundary which is provided at the avatars awareness ranged from the zone boundary as illustrated in FIG. 6. Thus instead of predicting whether the awareness zone will cross the zone boundary, it can equivalently be predicted whether the avatar will cross the intersection boundary. This technique of predicting the coincidence of the avatar position with the intersection boundary rather than predicting coincidence of the avatars awareness range d with the zone boundary simplifies the computation.

In FIG. 6 at an area marked "e" a small error occurs where the intersection boundary should in fact be rounded to ensure that it always lies at a distance d from the zone boundary. This error can however, be assumed to be negligible.

In the embodiments described hereinafter the prediction is thus a prediction of whether the avatar will cross the intersection boundary as illustrated in FIG. 6. In all of the following embodiments the position of the avatar is monitored at movement sample periods and the samples are used to populate each model. A window of samples, termed a model time frame, are used to form each model and the size of the set of samples and the frequency of its update is implementation dependent. When selecting the size of the set the implementation should ensure:

1. The set is large enough to reflect the general style of avatar motion, and not temporary types of motion caused by the local environment. For example, an avatar walking down a spiral staircase will be forced to adopt a curved path. A very small sample set in this scenario would cause the prediction model to reflect avatar motion as regularly changing direction, when this may not be indicative of the more unconstrained motion.

2. The set is small enough to allow the prediction model to adapt to new types of motion within a reasonable time frame. If the set is too large it may reflect multiple styles of avatar motion simultaneously which will seriously impair the accuracy of the predictions.

A first embodiment of the present invention will now be described with reference to FIGS. 7 to 9.

Figure 7:
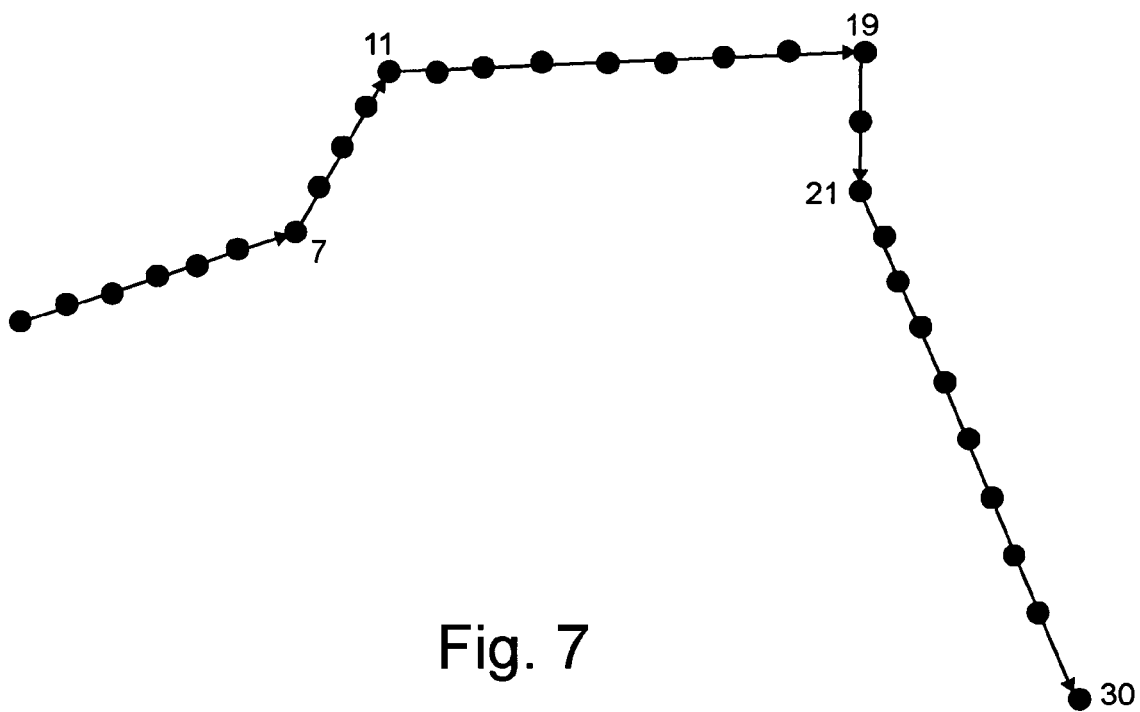
FIG. 7 is a schematic diagram of point to point avatar motion.

FIG. 7 illustrates avatar movement from sample point to sample point and treats the avatar movement as a series of straight runs each run comprising two or more sample points. In this embodiment the prediction model consists of a table of run lengths against a probability of occurrence Such a table is illustrated below:

| Run length (m) | Number of occurrences | Likelihood |
|---|---|---|
| 0.0-1.0 | 1000 | 1.0 |
| 1.0-2.0 | 870 | 0.87 |
| 2.0-3.0 | 700 | 0.7 |
| 3.0-4.0 | 500 | 0.5 |
| 4.0-5.0 | 300 | 0.3 |
| 5.0-6.0 | 100 | 0.1 |
| 6.0-7.0 | 10 | 0.01 |
| >7.0 | 0 | 0 |

FIG. 7 illustrates five runs in a model time frame or 30 sample. Each run length from sample 1 to 7, 7 to 11, 11 to 19, 19 to 21 and 21 to 30 is termed a prediction time frame and thus each model time frame consists of a variable number of variable length prediction time frames. When the direction of movement is detected as changing, a new prediction time frame (run length) is started.

In the table above the model time frame comprises 1001 samples (the first sample acting as a reference point). Occurrences are incremented not for a final run length but for each run length up to the final run length e.g. a total run length of 2.3 meters will result in an occurrence in each of the first three rows i.e. 0.0-1.0, 1.0-2.0 and 2.0-3.0. All run lengths have a length of at least between 0 and 1 meters. The number of run lengths having progressively longer run lengths decreases and no run lengths are longer than 7 meters. The table also includes a likelihood value which is calculated from the number of occurrences for a run length divided by the total number of occurrences i.e. the model time frame length minus 1. This is calculated each time the table entries are changed to keep the table up-to-date. The table is used by using the distance the avatar is away from the intersection boundary as an input to match to a run length to output the likelihood e.g. if the distance is 1.8 meters there is an 87% chance that the avatar will cross the boundary in this run, but if the distance is 8 meters there is no chance that the avatar will cross the boundary in this run.

Figure 8:
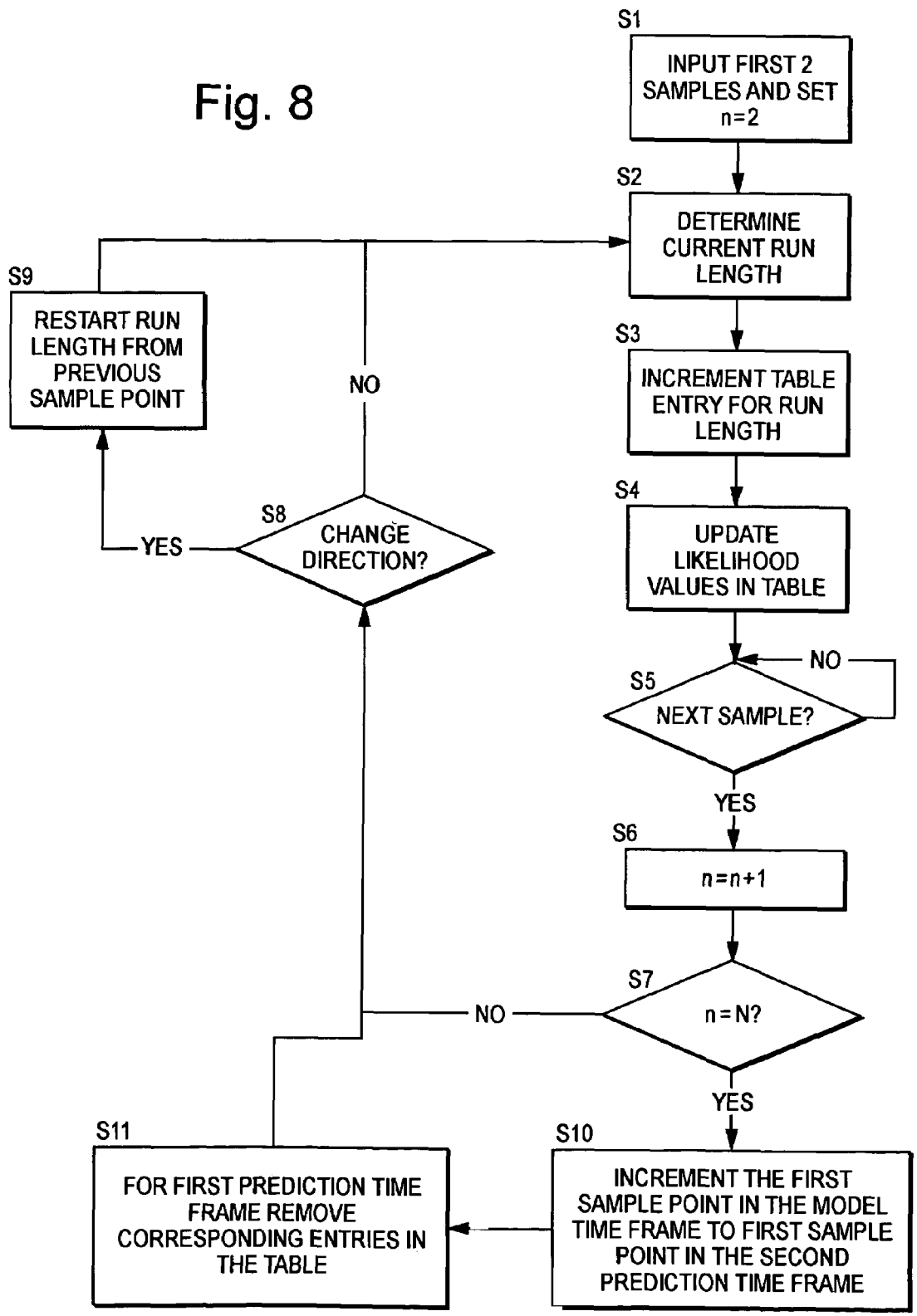
FIG. 8 is a flow diagram illustrating the determination of the model using run lengths.

FIG. 8 is a flow diagram illustrating how the table of run lengths and likelihoods comprising the model is formed.

In step S1 initially the first two samples are entered and a sample counter n is set to equal 2. In step S2 the current run length is determined and in step S3 the entry in the table for the current run length is incremented. The likelihood values in the table are then updated in step S4 and the next sample point is awaited in step S5. When the next sample point is received, in step S6 the length of the current sample in the model time frame is incremented i.e. n is set equal to n+1 and in step S7 it is determined whether the number of current sample points in the model time frame is equal to the maximum number of sample points N. If not, in step S8 it is determined whether there has been a change in direction and if not the process returns to step S2 wherein the current run length is determined. If a change in direction has been determined in step S8, in step S9 the run length is restarted from the previous sample point and the process returns to step S2.

If in step S7 it is determined that the model time frame is full, in step S10 the first sample point in the model time frame is incremented to the first sample point in the second prediction time frame in the model time frame i.e. to the second run length in the prediction time frame. The table entries corresponding to the first prediction time frame in the model time frame are then removed in step S11 so that the effect of the first time frame is removed from the model. In this way the model is kept up-to-date only taking into consideration the most recent run lengths.

Having deleted the oldest prediction time frame (run length) in step S11 the process then proceeds to step S8 to determine whether there has been a change in direction brought about by the new sample point. If there has been no change in direction the run length is determined in step S2 but if there has been a change in direction in step S9 the run length is restarted from the previous sample point and then the run length is determined in step S2.

Figure 9:
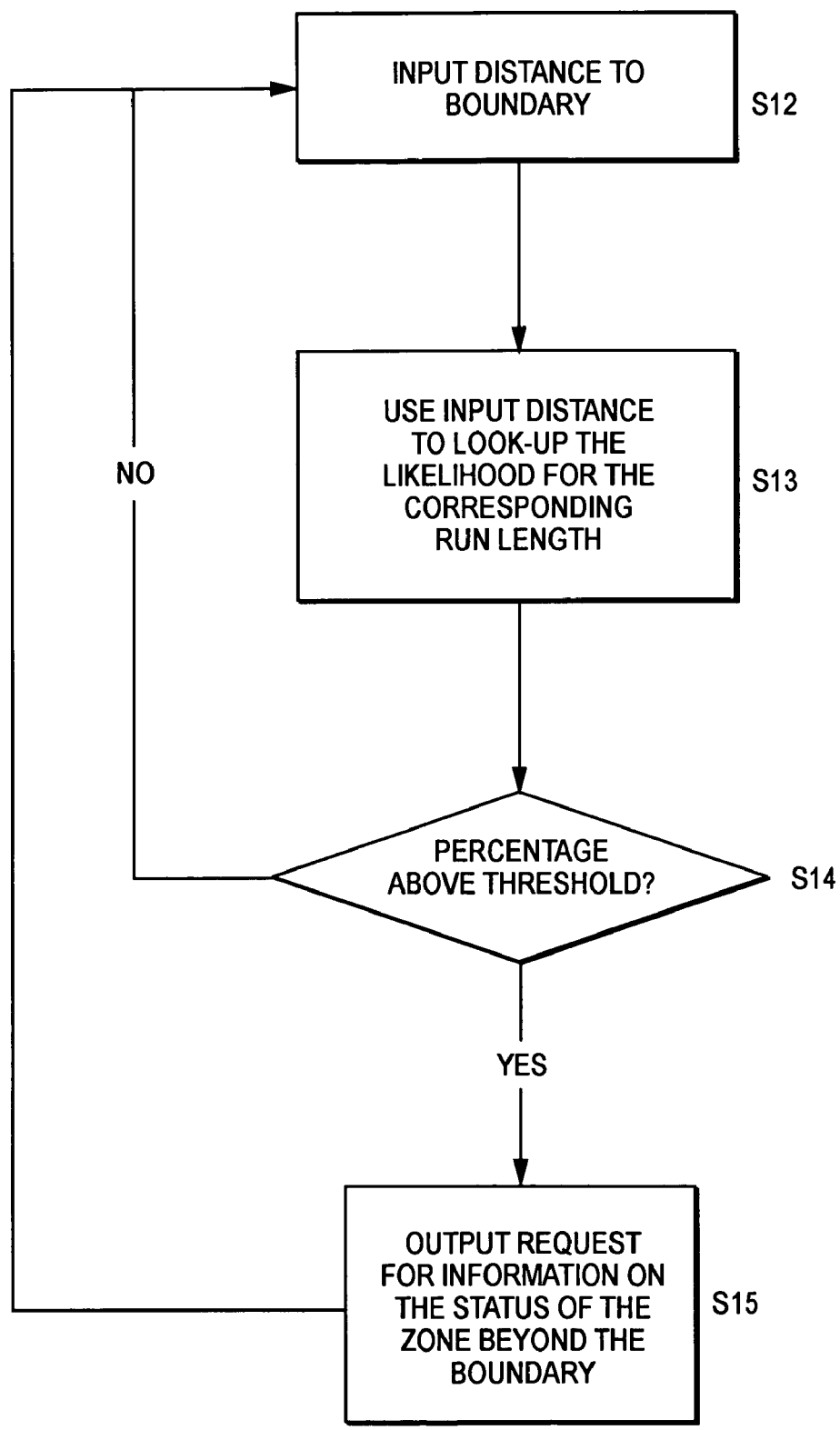
FIG. 9 is a flow diagram illustrating the method of using the model in order to determine when a client should become aware of the neighbouring zone.

FIG. 9 is a flow diagram illustrating how the model is used. In step S12 the distance to the zone boundary is input and in step S13 this is used to look-up the likelihood for a corresponding run length. Thus a likelihood of the avatar moving within a predetermined range of the boundary is determined. In step S14 this can be compared with a threshold to determine whether or not to request information on the status of the zone beyond the boundary in step S15. The threshold percentage used in step 514 can be predetermined independently to the implementation environment or it can be set in dependence upon the operating conditions e.g. the current network loading, the network loading required to obtain the status information, the current processing load, and the expected processing load for downloading the status information.

Figure 10:
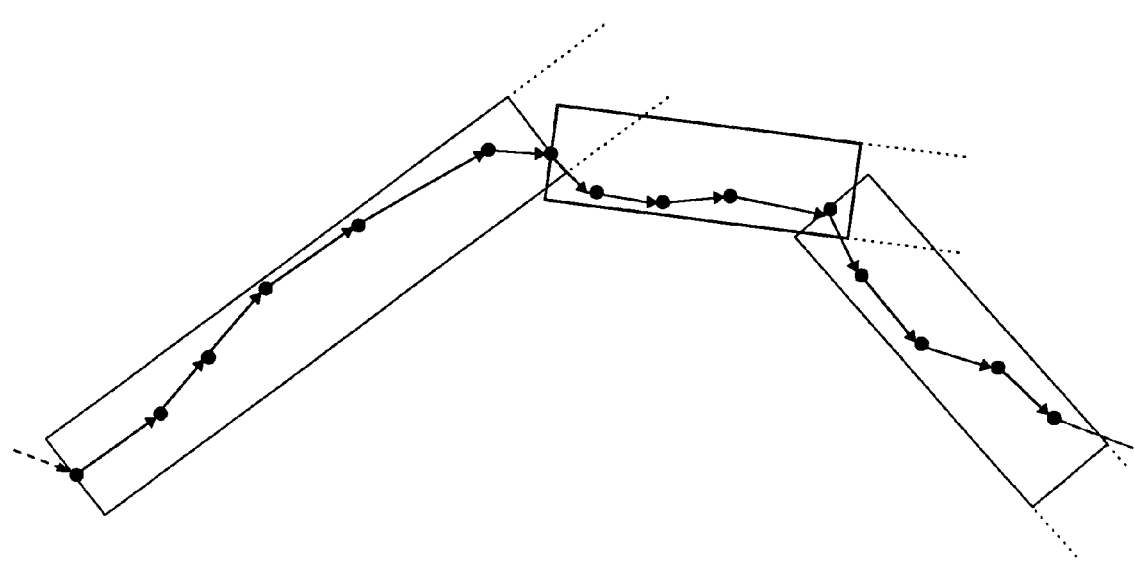
FIG. 10 is a diagram of avatar movement within corridors.

A second embodiment of the present invention will now be described with reference to FIGS. 10 and 11.

This embodiment of the present invention is similar to the first embodiment except that instead of measuring a run length as being from "point to point", a run length is calculated along a corridor. This allows for some deviation in the path before it is considered that the avatar has changed direction. FIG. 10 illustrates the use of corridors to define run lengths.

Figure 11:
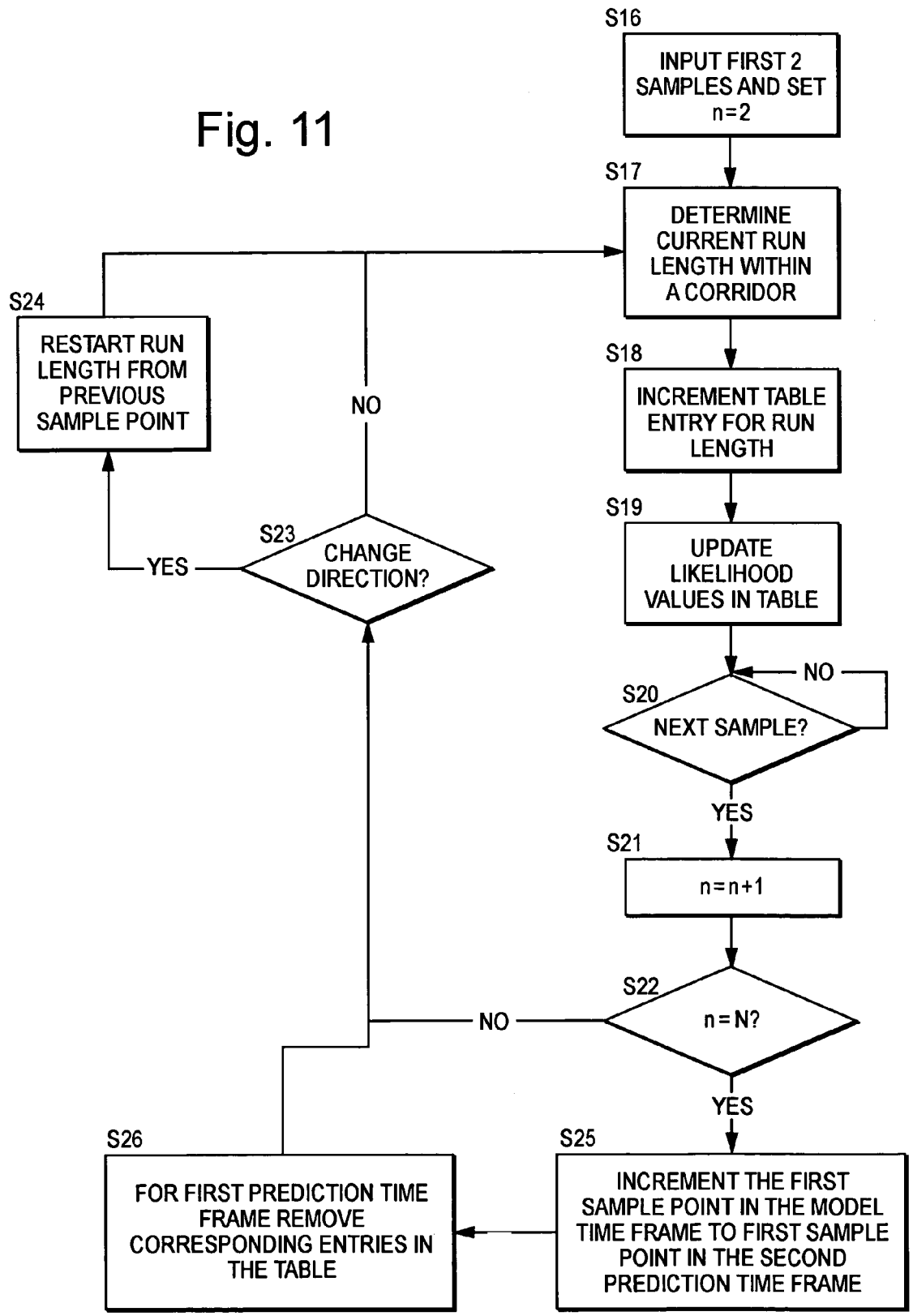
FIG. 11 is a flow diagram of the determination of the model from the motion of FIG. 10.

FIG. 11 is a flow diagram illustrating the operation of this embodiment. In step S16 the first two samples are input in the model time frame and the sample counter is set to equal 2. In step S17 the current run length within a corridor is determined and in step S18 the entry in the table for the current run length is incremented. In step S19 the likelihood values in the table are updated and in step S20 the next sample point is awaited. When the next sample point is received in step S21 the length of the current samples in the model time frame are incremented such that n is set equal to n+1. In step S22 it is then determined whether the number of current sample points in the model time frame equals N i.e. is the model time frame full, and if not the process proceeds to step S23 wherein it is determined whether there is a change in direction. If not, the process returns to step S17 whereupon the current run length within a corridor is determined. If a change of direction is determined in step S23, in step S24 the run length is restarted from the previous sample and the process returns to step S17.

If in step S22 it is determined that the model time frame is full, the first sample point in the model time frame is incremented to the first sample point in the second prediction time frame in the model time frame and in step S26 corresponding table entries for the first prediction time frame (the first run length) are removed. The process then proceeds to step S23.

This embodiment can be considered to be a more relaxed version of the embodiment illustrated with reference to FIGS. 7 and 8 since the run length embodiment illustrated in FIGS. 7 and 8 can be considered to have a corridor of 0 width.

A third embodiment of the present invention will now be described with reference to FIGS. 12 to 14.

Figure 12A:
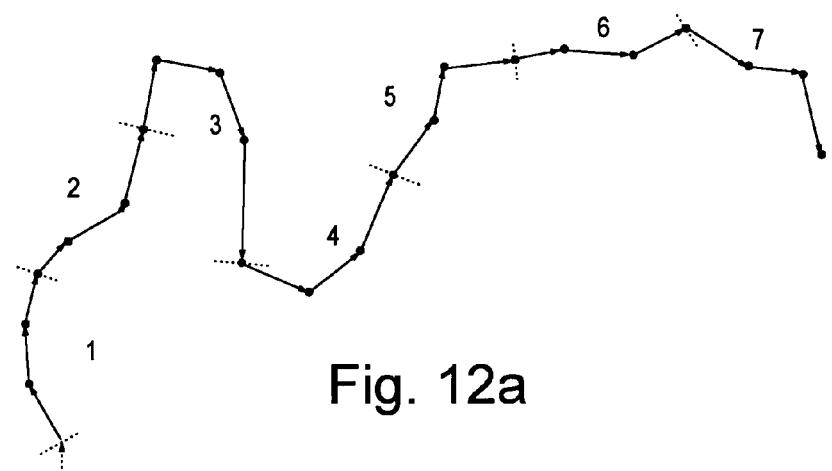
FIGS. 12a to 12d illustrate a method of forming the model of avatar movement over an area.

This approach attempts to map avatar motion into a probability area of occupation. As can be seen in FIG. 12a the avatar motion can be seen as a number of paths between points and this is broken up in the method to a series of segments 1 to 7.

Each of the segments comprises a prediction time frame. As illustrated in FIG. 10a the model time frame thus comprises seven prediction time frames in this embodiment.

Figure 13A:
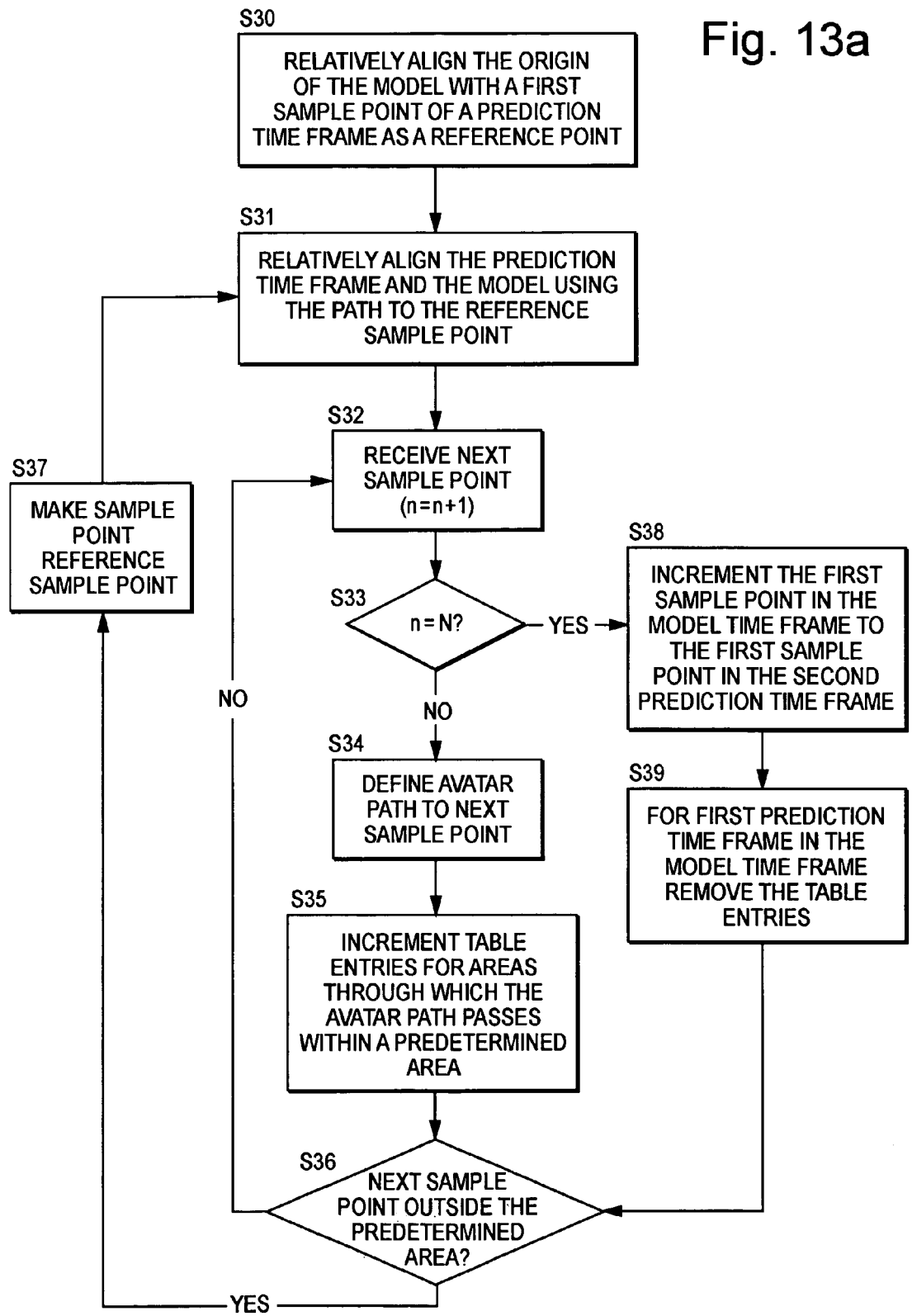
FIG. 13a is a flow diagram of a first method of determining a model using the technique of FIG. 12.

Referring to the flow diagram of FIG. 13a which illustrates a first method, in step S30 the first sample point of a prediction time frame is used as the origin of the model and thus the prediction time frame is relatively aligned with the origin of the model. In step S31 the prediction time frame is relatively aligned with the model using the path to the reference sample point as illustrated in FIG. 10b. The reference sample point comprises a first sample point in a segment and thus a first sample point in the prediction time frame. The path to the reference sample point is illustrated as "u" in FIG. 10b. In step S32 the next sample point is then received and the sample point counter n is incremented. In step S33 it is then determined whether the number of sample points n is equal to N i.e. the model prediction time frame is full. If not in step S34 the avatar path to the next sample point is defined and in step S35 for areas through which the avatar path passes within a predetermined area i.e. within the circle of FIGS. 10b, 10c and 10d, table entries are incremented. In step S36 it is then determined whether the next sample point is outside the predetermined area i.e. whether it is the first point in a next prediction time frame. If not the process returns to step S32 to receive the next sample point. If the next sample point is outside the area in step S37 the sample point is made the reference sample point and the process returns to step S30 whereupon the reference sample point is aligned with the origin of the model.

If in step S33 it is determined that the model time frame is full and another sample point has been received, in step S38 the first sample point in the model time frame is incremented to the first sample point in the second prediction time frame i.e. to a first sample point of the second segment. Then in step S39 the table entries for the first prediction time frame in the model are removed and the process proceeds to step S36. In this way the model time frame becomes a sliding time frame so that the model only takes into account recent behaviour of the avatar.

In the flow diagram of FIG. 13a the model time frame is moved along one prediction time frame at a time. Thus, the model time frame moves coarsely in jumps. In an alternative embodiment the model time frame is moved along point by point wherein the last prediction time frame of samples in a model is used each time to increment table entries.

Figure 12B:
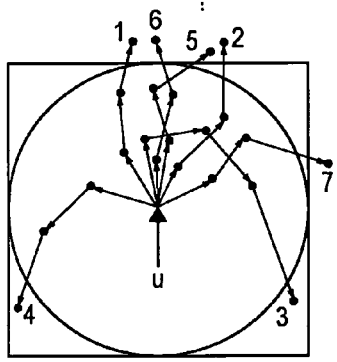
Figure 12C:
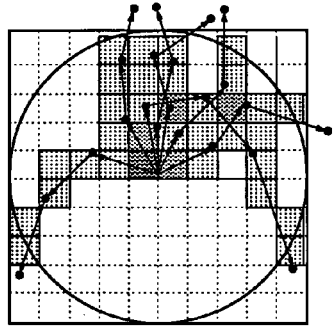
Figure 12D:
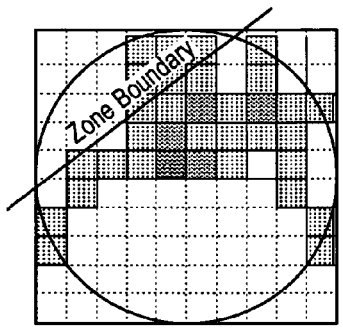
Figure 13B:
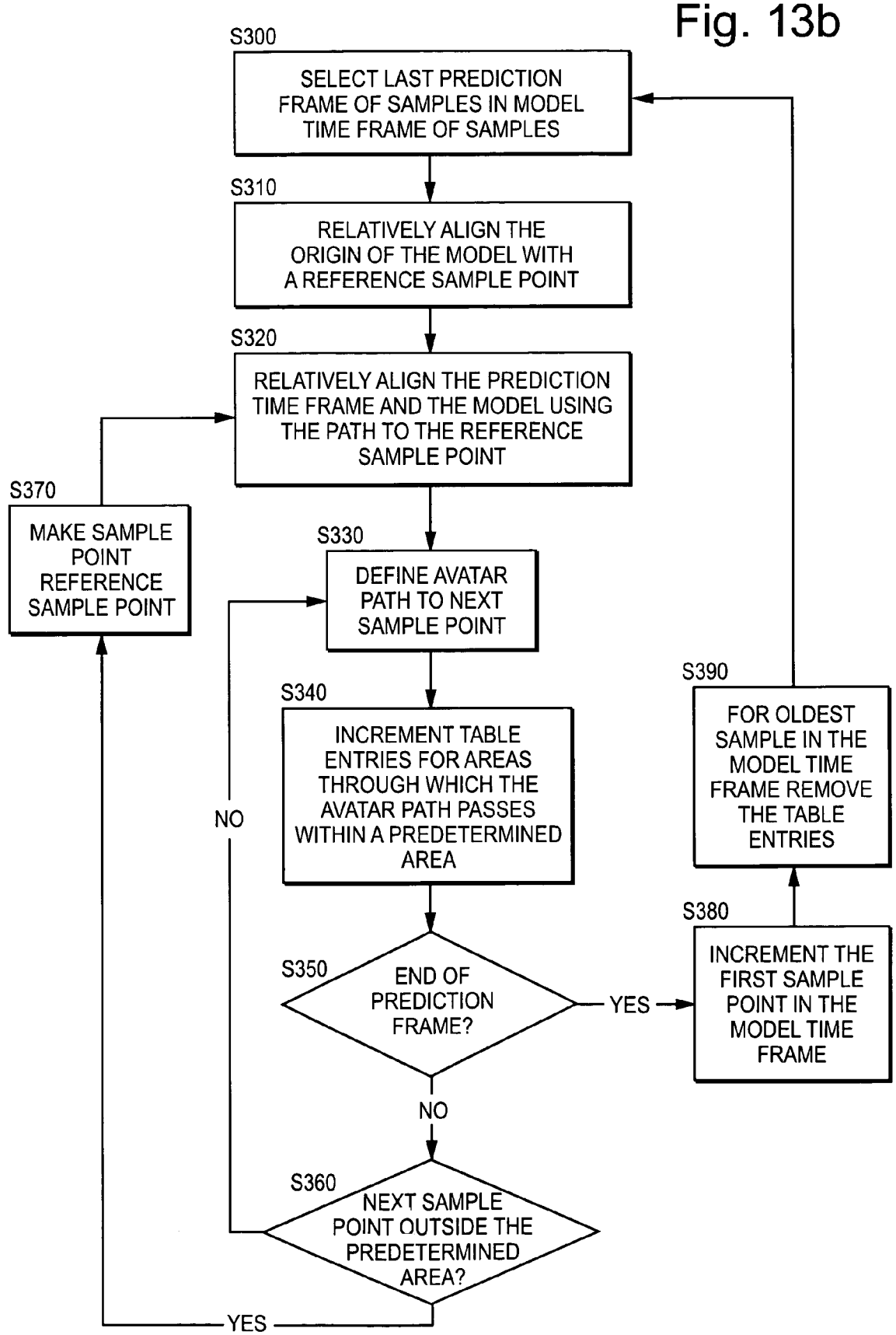
FIG. 13b is a flow diagram of a second method of determining a model using the technique of FIG. 12.

This method is illustrated in FIG. 13b. In step S300 the last prediction frame of samples in a model time frame of samples is selected and in step S310 the origin of the model is relatively aligned with a reference sample point as can be seen in FIG. 12b. The reference sample point comprises a first sample point in a segment. In step S320 the prediction time frame is relatively aligned with the model using the path to the first reference sample point. This is illustrated as "u" in FIG. 12b. The avatar path to the next sample point is then defined in step S330 and in step S340 for areas through which the avatar path passes within a predetermined area (i.e. within the circle of FIGS. 12b, 12c, and 12d) table entries are incremented.

In step S350 it is determined whether the end of the prediction frame has been reached and if not in step S360 it is determined whether the sample point lies outside the predetermined area i.e. the circle in FIGS. 12b to 12d. If not, the process returns to step S330 to find the next avatar path in the segment. If the sample point is outside the circle in step S350 the sample point is redefined as the reference sample point in step S370 and the process then returns to step S32 wherein the next segment is time aligned with the model.

It can thus be seen that steps S320 to S370 are repeated until all of the paths of the segments 1 to 7 have been mapped into the model to accumulate counts for the areas shown as squares FIG. 12c through which the paths pass. The counts accumulated in the table for each of the areas are indicated in FIGS. 12c and 12d by shading where the darker shading illustrates a higher count.

If in step S350 the end of the prediction time frame has been reached, the first sample point in the model time frame is incremented in step S380 and the table entries for the oldest sample in the model time frame are removed in step S390. The process then returns to step S300 to repeat for the next prediction frame.

Figure 14:
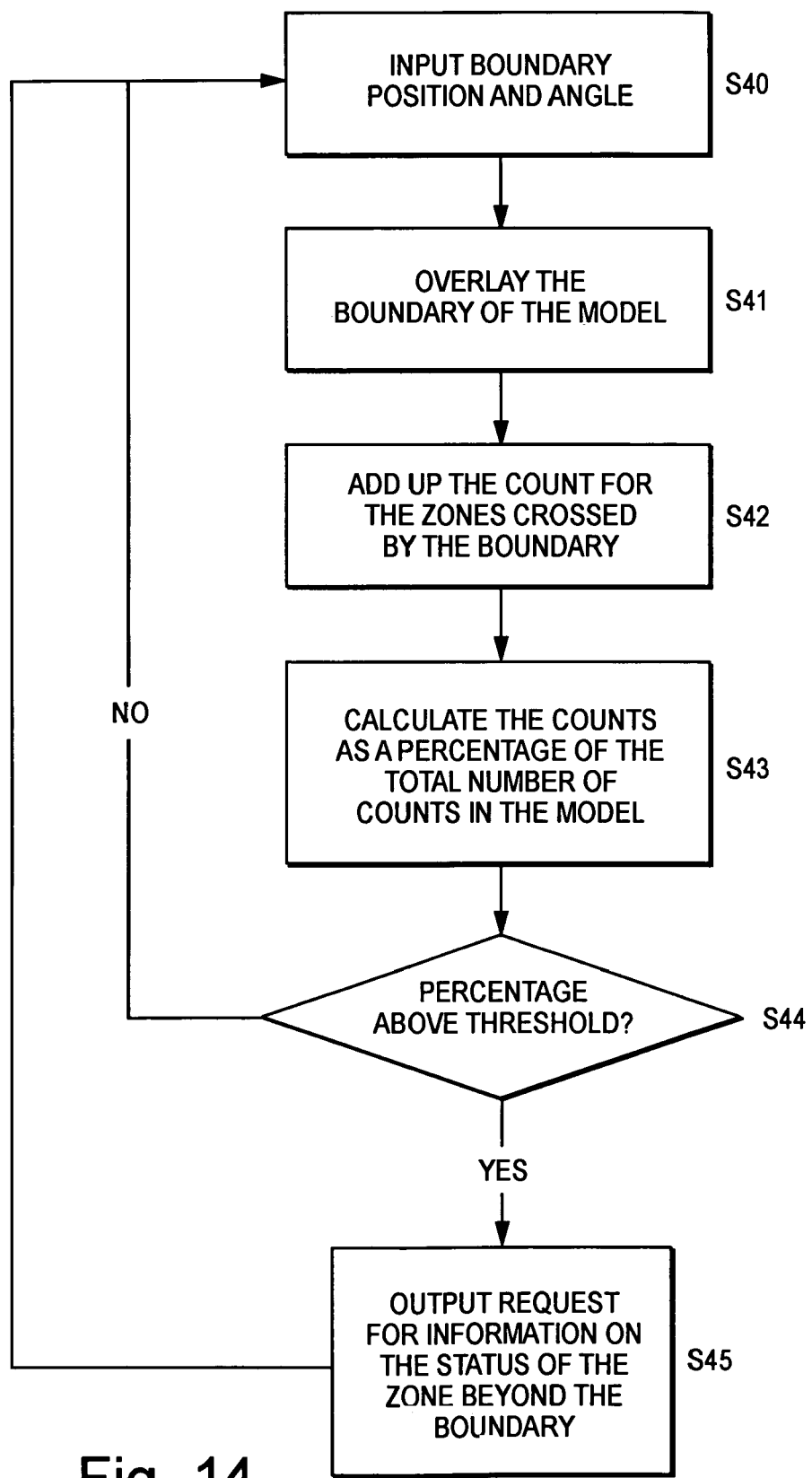
FIG. 14 is a method of using the model to determine avatar awareness of a neighbouring zone using the method of FIG. 12.

In order to utilise the model to predict the likelihood of an avatar crossing the intersection boundary, as illustrated in FIG. 14 in step S40 the boundary position and angle is input and in step S41 the boundary is overlaid on the model as illustrated in FIG. 12d. The counts for the zones crossed by the boundary are then added up in step S42 and in step S43 the counts are calculated as a percentage of the total number of counts in the model. The likelihood generated in step S43 is then compared with a threshold in step S44 and if the threshold is exceeded in step S45 the client will request information on the status of the zone beyond the boundary.

A fourth embodiment of the present invention will now be described with reference to FIGS. 15 to 18.

In this embodiment successive periods of avatar motion (sample sequences from the sample subset) are analysed against a series of potential zone boundaries to build a probability of boundary crossing model. This model is expressed as a table with three dimensions:

1. Angle between avatar direction of motion and zone boundary line.
2. Distance between avatar position and zone boundary line.
3. Time.

The granularity of this table is determined by the processing power available to the predictor. For a very fine grained table, each sequence of samples in the sample subset is compared against a large number of potential boundaries, over a wide range of times, and the table populated with the results. The coarser of the table granulator the fewer the boundary comparisons and less representation is required.

For example, if the model uses a granularity of 30 degrees and forward distance steps to approximate relative zone boundaries, 48 boundary representations will be produced. This is illustrated in FIG. 15a. Note that the zone boundaries are considered to extend to infinity in both directions such as shown in FIG. 15b for a set of boundaries at a particular distances.

A method of this embodiment of the present invention will now be described with reference to FIGS. 16 and 17.

The last prediction frame of samples in the model time frame of samples is selected in step S50. This is assuming that this has been carried out iteratively throughout the model time frame for prediction frames starting at each sample point that finishes outside the outer boundary segment of the model as for the previous embodiment. The origin of the model is relatively aligned with a reference sample point which comprises the first sample point in the prediction frame (step S51). In step S52 the prediction time frame is relatively aligned with the model using the path to the reference sample point. The results of steps S51 and S52 can be seen in FIG. 16a.

Figure 16A:
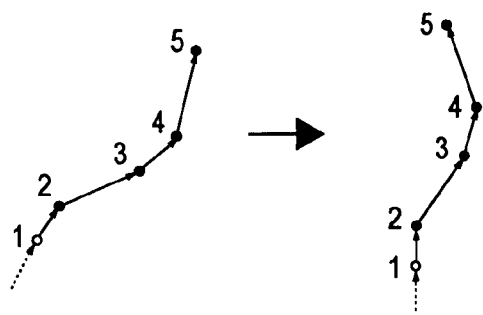
FIGS. 16a to 16e illustrate a method of determining the model of FIGS. 15a and 15b.
Figure 16B:
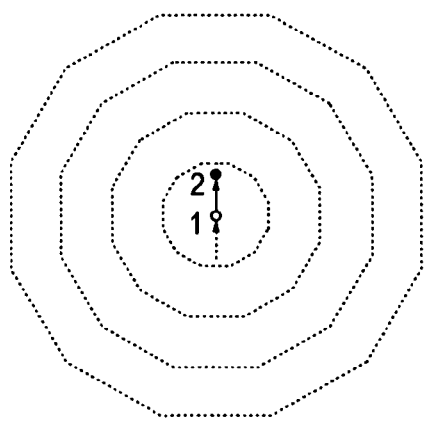
Figure 16C:
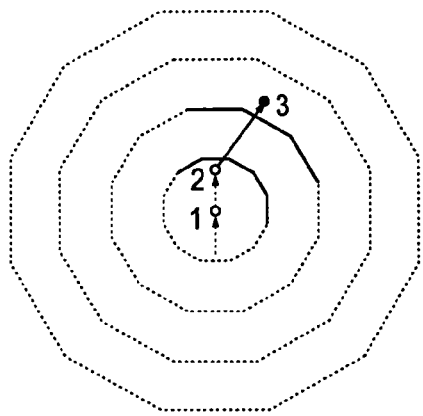
Figure 17:
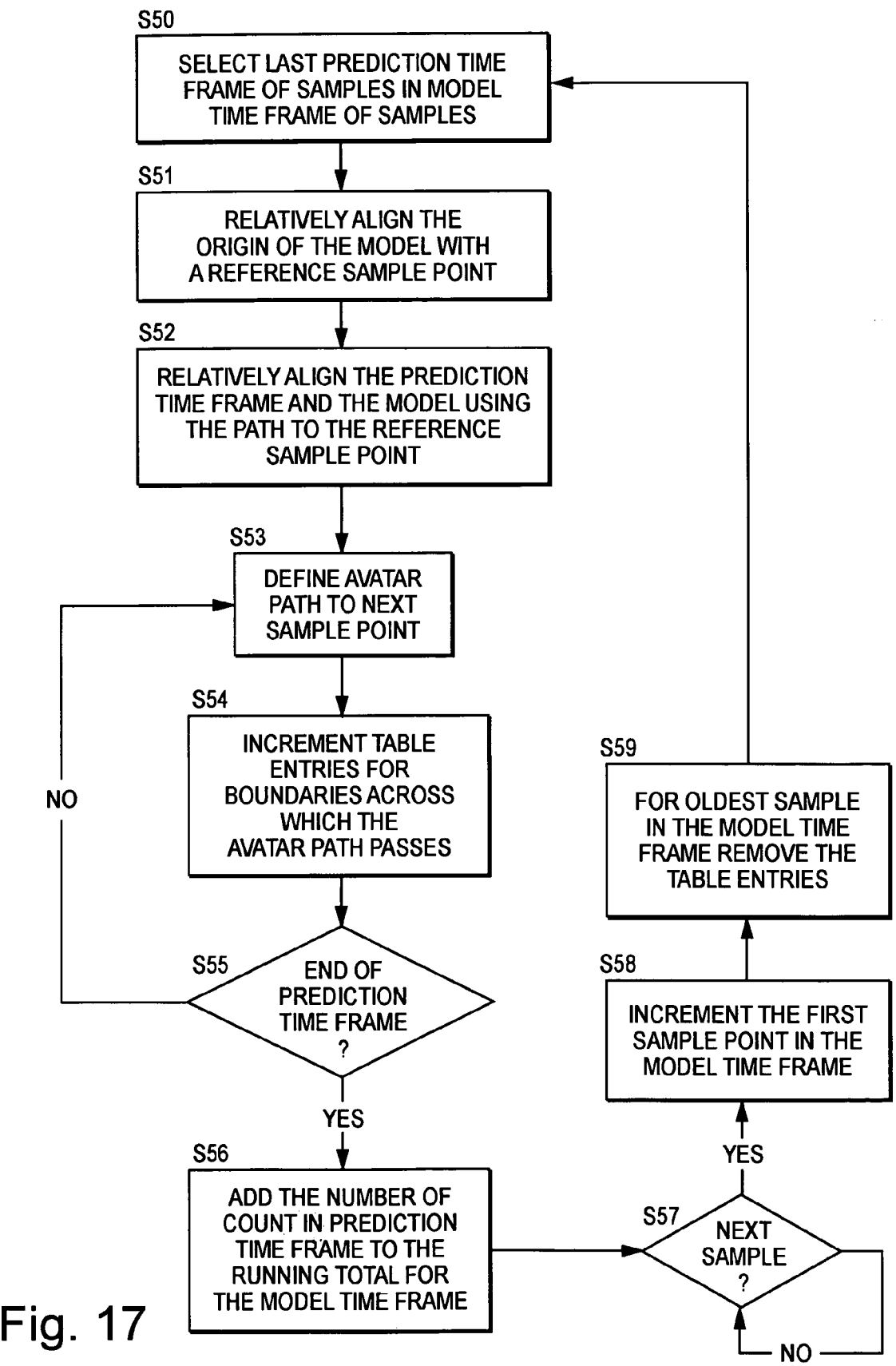
FIG. 17 is a flow diagram of the method of FIGS. 14a to 14e.

In step S53 the avatar path to the next sample point is defined as shown in FIG. 16b and in step S54 any table entries for boundaries across which the avatar path passes are incremented. In FIG. 16b no boundaries are crossed and thus no table entries are incremented. In step S55 it is then determined whether the prediction time frame has been processed i.e. whether the last sample point is outside the outer boundary, and if not the process returns to step S53. As can be seen in FIG. 16c the path to the next sample point is defined and this crosses eight of the theoretical boundaries which are incremented. Since each sample point corresponds to a time period these entries are made corresponding to that particular time period. For example, if the sample rate is 10 hertz the entries at 0.2 of a second would be incremented in the table.

Figure 16D:
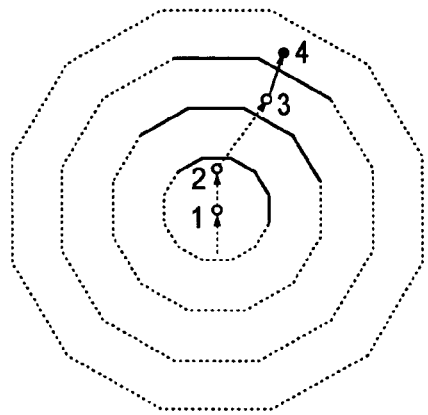

FIG. 16d illustrates the next loop through steps S53 to S55 wherein table entries for 0.3 of a second are implemented for the 11 boundary segments crossed.

Figure 16E:
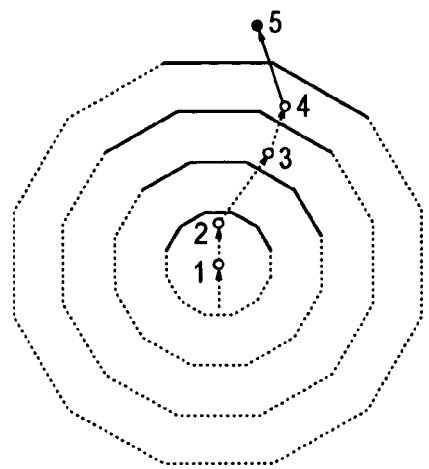

FIG. 16e illustrates the path from the fourth to fifth sample at 0.4 seconds and the 14 boundary segments crossed.

It should be noted that the determination of the boundary segments crossed is not made in dependence upon the path to each point it is made in dependence upon the path from the origin to the sample point. Hence the number of boundary segments crossed increases for each sample point in the prediction time frame.

Each boundary segment corresponds to entry of the table indexed by angle and distance and since the samples are input with respect to time, at each sample time, a different set of entries are made.

In step S56 at the end of the prediction time frame the number of counts in the prediction time frame is added to the running total for the model time frame i.e. the entries for the three dimensional table for the most recent prediction time frame is added into the three dimensional table for the previous prediction time frames of the model time frames.

The process then awaits the next sample in step S57 and when the next sample is received in step S58 the first sample point in the model time frame is incremented and in step S59 the table entries for the oldest sample in the model time frame are removed in order to update the table. The process then returns to step S50 so that the prediction time can be moved along one sample point within the model time frame.

Figure 18:
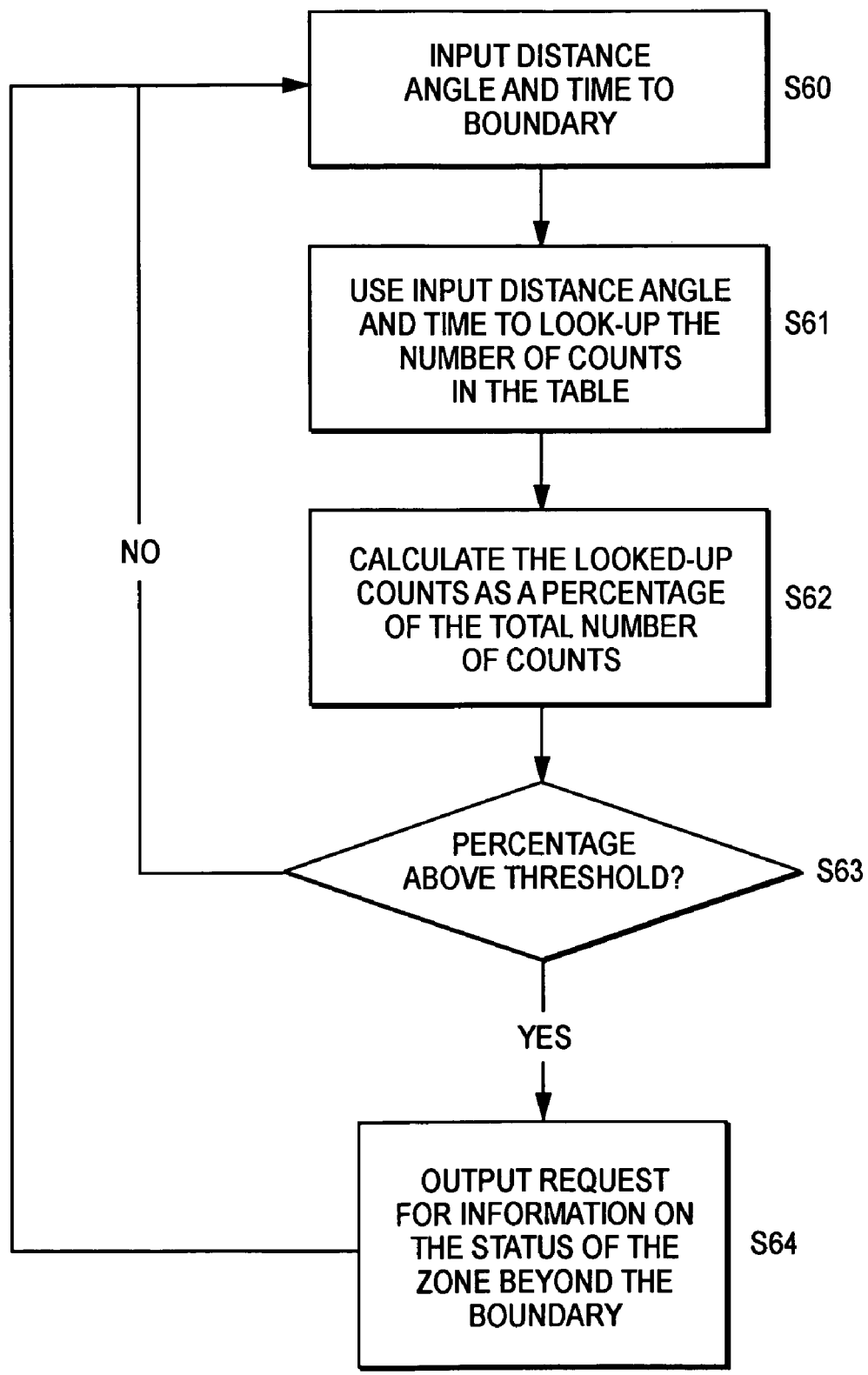
FIG. 18 is a flow diagram illustrating the method of using the model in order to determine avatar awareness of a neighbouring zone.

FIG. 18 is a flow diagram illustrating how the table is used. In step S60 the distance angle and time to the zone boundary are input and used in step S61 as three coordinates to look-up the number of counts in the table. The looked-up counts are then calculated as a percentage of the total number of counts in the table in step S62 in order to return a likelihood of the avatar crossing the intersection boundary. In step S63 it is then determined whether the percentage is above the threshold and if so, in step S64 the client requests information on the status of the zone beyond the boundary.

As for the pervious embodiments, the threshold in step S63 can be predetermined and can be dependent on a cost function such as network and processing penalties of establishing zone awareness.

Although in all the above embodiments the likelihood is shown as being obtained directly from the table (model) this likelihood can be modified to take into account the virtual environment between the avatar and the boundary e.g. if a wall is between the avatar and the boundary the likelihood can be reduced accordingly. Thus the predictor can not only take into account avatar movement but also the local environment.

By determining the likelihood of the avatar awareness region crossing into a zone it is possible to determine when and if to download the state of a zone of which the client is not currently aware. Since the downloading of the state of a zone imposed by the network and processing load of the client, the use of the model to provide an accurate prediction reduces the likelihood of unnecessarily downloading the state information. Also, once in a current state of a zone has been fetched it is necessary to track all the state changes that occur within it to ensure that the state stays current. Therefore, the accurate prediction produces the unnecessary traffic and processing load associated with an unnecessary download and updating.

In accordance with the embodiment of the present invention by taking into consideration the known network and processing penalties of establishing zone awareness, it is also possible for the client to control and tune the downloading of state information in order to suit the current state of the hardware implementing the virtual environment.

The present invention can be implemented in any type of zonal distributed virtual environment such as the NSPNET system and the system described in copending application number GB 9722343.2.

Although the present invention has been described hereinabove with reference to specific embodiments, it is apparent to a skilled person in the art that modifications are possible within the spirit and scope of the present invention.

What is claimed is:

1. A terminal for providing a virtual environment interface to server means which maintains said virtual environment as a plurality of zones, comprising:
   a client providing a user interface to the virtual environment to allow a user to control an avatar in the virtual environment; and
   apparatus for estimating the likelihood of said avatar, under the control of said user in the virtual environment, moving within a predetermined range of a boundary, the apparatus comprising:
   recording means for recording the position of the avatar at intervals to obtain movement data;
   means for storing data as to the relative frequency of occurrence of different categories of said movement;
   means arranged to read, from the stored data, frequency data for categories of movement such as would correspond to a potential movement of the avatar from its current position into a position within said predetermined range of said boundary;
   wherein the client is arranged to obtain information from said server means about the status of the adjacent zone before the avatar enters the adjacent zone only when the likelihood of the avatar moving within the predetermined range of the boundary of said adjacent zone is above a threshold.

2. The terminal according to claim 1 wherein said threshold is determined in dependence upon a cost function.

3. The terminal according to claim 1 wherein said threshold is determined in dependence upon the amount of communication traffic and/or the time taken for the communication with the server means.

4. The terminal according to claim 1 wherein said means for storing data is arranged to discard data relating to movement after a set period of time.

5. The terminal according to claim 1 wherein said recording means is adapted to record the position of said avatar at regular intervals of time in said virtual environment.

6. The terminal according to claim 1 wherein the potential movement of the avatar takes into consideration obstructions to the movement of said avatar within said virtual environment.

7. The terminal according to claim 1 wherein said predetermined range is dependent upon a range of awareness of said avatar within which said avatar can experience the virtual environment.

8. The terminal according to claim 1 wherein said categories of movement are determined by run lengths.

9. The terminal according to claim 1 wherein said categories of movement are determined by run lengths within a predefined corridor.

10. The terminal according to claim 1 wherein said categories of movement are determined by the movement of said avatar into areas around said avatar.

11. The terminal according to claim 1 wherein said categories of movement are determined by directions and distances of movement of said avatar.

12. An apparatus for estimating the likelihood of an avatar, under the control of a user in a virtual environment, moving within a predetermined range of a boundary, the apparatus comprising:
   recording means for recording the position of the avatar at intervals to obtain movement data;
   means for storing data as to the relative frequency of occurrence of different categories of said movement;
   means arranged to read, from the stored data prior to the avatar moving across the boundary, frequency data for categories of movement such as would correspond to a potential movement of the avatar from its current position into a position within said predetermined range of said boundary; and
   means for providing an instruction to obtain information about the status of a zone adjacent to the boundary before the avatar enters the zone adjacent to the boundary only when the likelihood of the avatar moving within the predetermined range of the boundary is above a threshold.

13. The apparatus according to claim 12 wherein said means for storing data is arranged to discard data relating to movement after a set period of time.

14. The apparatus according to claim 12 wherein said recording means is adapted to record the position of said avatar at regular intervals of time in said virtual environment.

15. The apparatus according to claim 12 wherein the potential movement of the avatar takes into consideration obstructions to the movement of said avatar within said virtual environment.

16. The apparatus according to claim 12 wherein said predetermined range is dependent upon a range of awareness of said avatar within which said avatar can experience the virtual environment.

17. An apparatus for estimating the likelihood of an avatar, under the control of a user in a virtual environment, moving within a predetermined range of a boundary, the apparatus comprising:
   recording means for recording the position of the avatar at intervals to obtain movement data;
   means for storing data as to the relative frequency of occurrence of different categories of said movement; and
   means arranged to read, from the stored data prior to the avatar moving across the boundary, frequency data for categories of movement such as would correspond to a potential movement of the avatar from its current position into a position within said predetermined range of said boundary; wherein said categories of movement are determined by run lengths.

18. An apparatus for estimating the likelihood of an avatar, under the control of a user in a virtual environment, moving within a predetermined range of a boundary, the apparatus comprising:
   recording means for recording the position of the avatar at intervals to obtain movement data;
   means for storing data as to the relative frequency of occurrence of different categories of said movement; and
   means arranged to read, from the stored data prior to the avatar moving across the boundary, frequency data for categories of movement such as would correspond to a potential movement of the avatar from its current position into a position within said predetermined range of said boundary; wherein said categories of movement are determined by run lengths within a predefined corridor.

19. The apparatus according to claim 12 wherein said categories of movement are determined by the movement of said avatar into areas around said avatar.

20. The apparatus according to claim 12 wherein said categories of movement are determined by directions and distances of movement of said avatar.

21. A system for providing a distributed virtual environment comprising:
   one or more servers for maintaining said virtual environment as a plurality of zones, said one or more servers receiving communication from a client to allow a user to control an avatar in the virtual environment; and
   an apparatus for predicting the likelihood of said avatar moving within a predetermined range of a boundary of a zone in the virtual environment;
   wherein said one or more servers is arranged to communicate with the client to provide information on the status of one or more further zones in the virtual environment before the avatar enters said one or more further zones when the likelihood of the avatar moving within a predetermined range of the boundary of said one or more further zones predicted by the apparatus is above a threshold.

22. The system according to claim 21 wherein said threshold is determined in dependence upon a cost function.

23. The system according to claim 21 wherein said threshold is determined in dependence upon the amount of communication traffic and/or the time taken for the communication with the one or more servers.

24. A method of operating a computer terminal to provide a virtual environment interface to server means which maintain said virtual environment as a plurality of zones, the method comprising:
   controlling a client which provides a user interface to the virtual environment to allow a user to control an avatar in the virtual environment; and
   estimating the likelihood of said avatar, under the control of said user in a virtual environment, moving within a predetermined range of a boundary, estimating said likelihood comprising:
   recording the position of the avatar at intervals to obtain movement data;
      storing data as to the relative frequency of occurrence of different categories of said movement; and
      reading, from the stored data, frequency data for categories of movement such as would correspond to a potential movement of the avatar from its current position into a position within said predetermined range of said boundary; and
   instructing the client to obtain information from said server means about the status of an adjacent zone before the avatar enters the adjacent zone only when the likelihood of the avatar moving within the predetermined range of the boundary of said adjacent zone is above a threshold.

25. The method according to claim 24 wherein said threshold is determined in dependence upon the amount of communication traffic and/or the time taken for the communication with the server means.

26. The method according to claim 24 wherein stored movement data is discarded after a set period of time.

27. A storage medium readable by a computer, tangibly embodying a program of instructions executable by the computer to carry out a method of operating a computer terminal to provide a virtual environment interface to a server which maintains the virtual environment as a plurality of zones, steps of the method comprising:
   controlling a client which provides a user interface to the virtual environment to allow a user to control an avatar in the virtual environment; and
   estimating the likelihood of said avatar, under the control of said user in a virtual environment, moving within a predetermined range of a boundary, estimating said likelihood comprising:
      recording the position of the avatar at intervals to obtain movement data;
      storing data as to the relative frequency of occurrence of different categories of said movement; and
      reading, from the stored data, frequency data for categories of movement such as would correspond to a potential movement of the avatar from its current position into a position within said predetermined range of said boundary; and
   instructing the client to obtain information from said server about the status of an adjacent zone before the avatar enters the adjacent zone only when the likelihood of the avatar moving within the predetermined range of the boundary of said adjacent zone is above a threshold.

28. A computer-implemented method for processing signals related to provide a virtual environment interface to at least one server which maintains said virtual environment as a plurality of zones, the method comprising:

controlling a client which provides a user interface to the virtual environment to allow a user to control an avatar in the virtual environment; and estimating the likelihood of said avatar, under the control of said user in a virtual environment, moving within a predetermined range of a boundary, estimating said likelihood comprising:

recording the position of the avatar at intervals to obtain movement data;

storing data as to the relative frequency of occurrence of different categories of said movement; and reading, from the stored data, frequency data for categories of movement such as would correspond to a potential movement of the avatar from its current position into a position within said predetermined range of said boundary; and instructing the client to obtain information from said server about the status of an adjacent zone before the avatar enters the adjacent zone only when the likelihood of the avatar moving within the predetermined range of the boundary of said adjacent zone is above a threshold.

29. In a computer system having at least one server for providing a virtual environment having a plurality of zones in which an avatar may move in response to user control signals received from a client, a method comprising:

monitoring movement of the avatar within the virtual environment for a period of time;

determining a pattern of movement of the avatar based on the monitored movement;

predicting a likelihood of the avatar, based on the determined pattern of movement, of moving to within a predetermined range of a boundary of a zone in which the avatar is currently positioned;

determining whether or not the predicted likelihood exceeds a threshold; and obtaining information for a zone adjacent to the zone in which the avatar is currently positioned before the avatar enters the adjacent zone when the predicted likelihood exceeds the threshold.

30. The method of claim 29 wherein the threshold is determined in dependence upon a cost function, the amount of communication traffic of the at least one server, or an amount of time taken for the communication with the at least one server.

31. The method of claim 29 wherein monitoring the movement of the avatar includes obtaining a sliding window of data samples describing the avatar movement.

32. The method of claim 29 wherein predicting the likelihood of the avatar of moving to within the predetermined range of the boundary includes considering features within the virtual environment which restricts movement of the avatar.

33. The method of claim 29 wherein predicting the likelihood of the avatar of moving to within the predetermined range of the boundary includes considering features within the virtual environment which restricts an ability of the avatar to experience the virtual environment.

34. The method of claim 29 wherein predicting the likelihood of the avatar of moving to within the predetermined range of the boundary includes referring to a prediction model having a data table of run lengths of avatar movement and corresponding likelihood to cross a zone boundary.

* * * * *